(12) United States Patent
Fukuoh et al.

(10) Patent No.: US 8,245,303 B2
(45) Date of Patent: Aug. 14, 2012

(54) JOB PROCESSING SYSTEM AND IMAGE PROCESSING APPARATUS

(75) Inventors: Chohiko Fukuoh, Musashimurayama (JP); Masaki Kakutani, Hiratsuka (JP); Takashi Kondo, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 12/880,214

(22) Filed: Sep. 13, 2010

(65) Prior Publication Data

US 2011/0067100 A1 Mar. 17, 2011

(30) Foreign Application Priority Data

Sep. 17, 2009 (JP) ................... 2009-216231

(51) Int. Cl.
*G06F 12/14* (2006.01)
(52) U.S. Cl. ............................. 726/24; 726/2
(58) Field of Classification Search .............. None
See application file for complete search history.

(56) References Cited

U.S. PATENT DOCUMENTS 5,832,208 A * 11/1998 Chen et al. ................. 726/24
7,941,541 B2 * 5/2011 Chang et al. ............... 709/227
2004/0230318 A1 * 11/2004 Shimizu ....................... 700/1
2008/0163372 A1 * 7/2008 Wang ........................... 726/24

FOREIGN PATENT DOCUMENTS

| JP | 10-040097 | 2/1998 |
| JP | 2005-229611 A | 8/2005 |
| JP | 2006-256104 A | 9/2006 |
| JP | 2008-015842 | 1/2008 |

OTHER PUBLICATIONS

Office Action (Notice of Reasons for Refusal) dated Apr. 19, 2011, issued in the corresponding Japanese Patent Application No. 2009-216231, and an English Translation thereof.

* cited by examiner

*Primary Examiner* — Peter Poltorak
(74) *Attorney, Agent, or Firm* — Buchanan Ingersoll & Rooney PC

(57) ABSTRACT

A multi function periphery includes a plurality of the modules (a scan control section 35 to file system section 40) provided corresponding to a plurality of functions, a virus check section 33 to perform the virus check with respect to the plurality of the control modules, a virus control section 32 to make the virus check section 33 to perform the virus check respectively for some control modules among the plurality of the control modules, a job administration section 31 to allow the job using only the control modules which have been confirmed not to be infected by the virus via the virus check.

35 Claims, 13 Drawing Sheets

JOB PROCESSING SYSTEM AND IMAGE PROCESSING APPARATUS

This application is based on Japanese Patent Application No. 2009-216231 filed on Sep. 17, 2009, in Japanese Patent Office, the entire content of which is hereby incorporated by reference.

TECHNICAL FILED

The present invention relates to a job processing system to inspect whether or not a computer virus infects a system to conduct job processing and an image processing apparatus included in the job processing system.

BACKGROUND

In recent years, multifunction peripherals and printers using computers in which a general purpose operation system is installed have became popular and capable of adapting to a network. The above multifunction peripherals and printers have a risk to be infected by computer viruses and a risk to spread infection of the computer virus over other apparatuses, therefore virus countermeasures are taken.

For example, there is a technology that the multifunction peripheral conducts virus inspection periodically with respect to programs and data in the multifunction peripheral and conducts an action to recover, quarantine or delete if the program and the data infected by the virus are detected (Patent Document 1: Unexamined Japanese Patent Application Publication No. 2005-229611). Also, there is another technology that a printer conducts a virus inspection with respect to print data received from a terminal of a client and forces to stop operation and interrupts power supply, or restricts or interrupts network connection. Further the printer conducts a virus elimination process so as to prevent infection from spreading (secondary infection) (Patent Document 2: Unexamined Japanese Patent Application Publication No. 2006-256104).

Patent Document 1: Unexamined Japanese Patent Application Publication No. 2005-229611

Patent Document 2: Unexamined Japanese Patent Application Publication No. 2006-256104

As the above Patent Document 1, in case the virus check is periodically conducted, or the program and the data infected by the virus is recovered when the virus is detected, the job may be suspended or delayed which may cause reduction of the productivity. In the technology of the Patent Document 2, when the virus is detected through the virus inspection with respect to the received print data, all operations are forced to be stopped and the productivity is reduced as well.

To detect infection of the virus, the virus inspection (virus check) has to be conducted with respect to the programs in the control modules in the apparatus. In a state where the virus inspection has not been conducted, whether or not the control module is infected is unclear and it is risky to operate the control module for executing the job. Provided that the control module is infected by the virus, there are risks of incorrect operation by the computer virus and spreading infection when the control module is operated. Whereby, it is preferred that the job is executed when "no infection" is confirmed as a result of the virus inspection.

However, since the multifunction peripheral having a plurality of functions such as scanning, printing, facsimile and e-mail transmission is provided with a plurality of control modules corresponding to the plurality of the functions, the virus inspection with respect to all the control modules takes time. Namely, if a periodical virus inspection or a virus inspection prior to job execution is conducted, start of job execution is delayed which causes a reduction of the productivity.

SUMMARY

The present invention has one aspect to resolve the above problems and an object of the present invention is to provide the job processing system and the image processing apparatus which suppress the reduction of the productivity by suppressing an effect to job processing caused by the computer virus inspection.

To achieve at least one of the abovementioned objects, the system reflecting one aspect of the present invention includes the following items.

[1] A job processing system, having:

a plurality of control modules, to be used for execution of a job, configured with a different combination of one or more modules used in accordance with the job;

an inspection section to inspect whether or not to be infected by a computer virus with respect to the plurality of the control modules;

an inspection control section to make the inspection section to perform the virus inspection of whether or not to be infected by the computer virus respectively for some control modules among the plurality of the control modules; and a permission section to permit execution of the job which uses only the control modules which have been confirmed being not infected by the computer virus via the virus inspection among the plurality of the control modules.

[2] A job processing system, having:

a plurality of control modules, to be used for execution of a job, configured with a different combination of one or more modules used in accordance with the job;

an inspection section to inspect whether or not to be infected by a computer virus with respect to the plurality of the control modules;

an inspection control section to make the inspection section to perform inspection of whether or not to be infected by the computer virus respectively for some control modules among the plurality of the control modules; and a permission section to permit execution of the job which does not uses the control modules which have not been confirmed being not infected by the computer virus via the virus inspection among the plurality of the control modules.

In the above items [1] and [2], the inspection control section makes the inspection section to perform inspection of whether or not to be infected by the computer virus respectively for some control modules among the plurality of the control modules configured with a different combination of one or more modules used in accordance with the job. Meaning of "respectively for some control modules" includes "respectively for control modules (individual control modules)". For example, it can be "respectively for the control modules by the jobs" or "respectively for the control modules not by the jobs". A timing to perform the virus inspection can be a timing synchronized with job execution or not synchronized with job execution (a period in which no job is being executed, a periodical timing and a predetermined time).

The permission section in item [1] permits execution of the job using only the modules which have been confirmed not to be infected by the computer virus via the virus inspection among the plurality of the modules. The modules which have been confirmed not to be infected by the computer virus include the control modules which have been confirmed that the computer virus has not been found when the virus inspection was completed and the control modules which have been confirmed that the computer virus has been found when the virus inspection was completed and the virus has been removed. Namely, the control modules which are confirmed that the computer virus has not been found via the virus inspection and the control modules confirmed that the computer virus has been found when the virus inspection was completed and the virus has been removed are included. Also, "the job using only the modules . . . " does not mean "all the modules in which the virus has not been found are used" and it specifically means that at least one or more modules in which the virus has not been found are used by the job" In the configuration of item [1], the execution of the job which uses the control modules which have been confirmed being not infected by the virus is permitted.

The permission section in item [2] permits execution of the job not using the modules which have not been confirmed being not infected by the computer virus via the virus inspection among the plurality of the modules. Here, the control modules which have not been confirmed being not infected by the computer virus include the control modules which have not been confirmed being not infected because the virus inspection has not been completed (the virus inspection has not yet been executed or not yet been completed) and the control modules which have not been confirmed that the control module is not infected by the virus because the computer virus is detected when the virus inspection was completed but the virus has not yet been removed (virus removing has not yet been executed or not yet been completed). In the configuration of item [2], execution of the job which does not use the control modules which have not been confirmed being not infected is permitted.

For example, in case of the first job which uses some specific control modules among the plurality of the control modules and the second job which uses some other control modules (for example, all the control modules except the some specific control modules), if the some specific control modules have not been confirmed being not infected and some other control modules have been confirmed being not infected, execution of the second job is permitted.

Specifically, in the configuration of item [1], execution of the second job which uses some other modules which have been confirmed being not infected by the virus via the virus inspection among the plurality of the control modules is permitted. In the configuration of item [2] execution of the second job which does not use some specific modules which have not confirmed being not infected by the virus via the virus inspection among the plurality of the control modules is permitted.

Incidentally, execution of the job which uses the control modules (the control modules not having been subject to the virus inspection or not having been subject to removing virus after the virus inspection are included) which have not been confirmed being not infected by the computer virus via the virus inspection can be prohibited.

Whereby, while obviating the possibility of expansion of infection and incorrect operation in case the control modules are infected by the virus by operating the control modules to execute the job which uses the control modules which are uncertain whether or not to be infected, the job which uses the control modules having no possibility of infection can be executed. Therefore, the effect to the job processing due to the virus inspection is suppressed and a reduction of the productivity is suppressed.

[3] A job processing system, having:

a plurality of control modules, to be used for execution of a job, configured with a different combination of one or more modules used in accordance with the job;

an inspection section to inspect whether or not to be infected by a computer virus with respect to the plurality of the control modules; and an inspection control section to make the inspection section to perform the virus inspection of whether or not to be infected by the computer virus with respect to each control module used for one job.

In the above description, the inspection control section makes the inspection section to conduct the virus inspection of whether or not being infected by the computer virus, with respect to each of the plurality of the control modules to be used for execution of one job configured with a different combination of one or more modules. A timing to conduct the virus inspection can be, for example, a timing synchronized with execution of the job or a timing not synchronized with execution of the job (a period in which no job is being executed, a periodically timing and a predetermined time).

In the above configuration where the virus inspection is conducted with respect to each control module for each job, for example, it is not impossible that the job cannot be executed until the virus inspection with respect to all the control modules are completed, and the job using the control modules having been subject to the virus inspection (non-infection of the virus is confirmed through the virus inspection including removing of the virus after the inspection) can be executed. Whereby, the effect of the virus inspection to the job processing is suppressed and reduction of the productivity can be suppressed.

[4] The job processing system of item 1, wherein the inspection control section makes the virus inspection section to perform the inspection with respect to the control modules to be used for execution of the job before executing the job.

In the above embodiment, when the job is executed, the virus inspection is performed with respect to the control modules to be used for the job. Whereby, after confirming that the control modules are not infected by the virus or after removing the virus if infected by the virus, the job is executed, and the control modules used in the job can be operated. Thus, damages caused by the computer virus, in case that the control modules are infected by the virus, can be obviated unfailingly.

Also, since the virus inspection is performed only for the control modules necessary for the job to be executed from now and the virus inspection having less necessity for the unnecessary control modules currently not used for the job is not perform, a burden of the virus inspection can be reduced. Whereby, the virus inspection performed before execution of the job is completed quickly and a delay of starting job execution can be minimized, whereby the reduction of the productivity can be suppressed.

[5] The job processing system of item 1, wherein the inspection control section makes the virus inspection section to perform the inspection with respect to the control modules which have been used for execution of the job after executing the job.

In the above embodiment, in case the job has been executed, the virus inspection is performed for the control modules used in the job. Whereby, the control modules can be operated for subsequent use after confirming not to be infected or after removing the virus in case of being infected. Thus the damages caused by the computer virus in next use can be obviated.

Also, since the virus inspection is performed for the control modules having been used and the virus inspection having less necessity for the control modules currently not used for the job is not perform, the burden of the virus inspection can be reduced. Also, since the virus inspection starts after use of the control modules (after execution of the job), the job which uses the control modules subsequently can be started rapidly compared to a case where the virus inspection starts before use (before job execution). Thus the effect of suppressing reduction of the productivity is enhanced.

[6] The job processing system of item 2, wherein execution of a first job, which uses the control modules which have not been confirmed being not infected by the computer virus via the virus inspection among the plurality of the control modules, is held, and execution of a second job, which uses only the control modules which have been confirmed being not infected, is started.

In the above embodiment, the virus inspection is omitted for the control modules having been confirmed being not infected by the virus inspection for a predetermined period after confirmation, i.e. a predetermined period after confirming being not infected by the virus by the virus inspection related to the confirmation. The above control modules are treated, acknowledging that the control modules are confirmed being not infected by the virus via the virus inspection at least for the predetermined period.

The predetermine period can be configured with, for example, the number of times of use of the control module, or hours of use (cumulative hours of use). Also, the predetermined period can be a discretionary period (discretionary number of times/hours) and a period in which the continuous use of the control module is allowed (continuous use/allowable period (allowable number of times/allowable hours)). Also, for example, if it can be predicted that the control module can be used without being infected by the virus at least in a period (number of times/hours), the period can be the predetermined period. In other words, the above period is a period where a non-infected condition by the virus can be deemed to be maintained (possible period where the virus non-infected condition is maintained (possible number of times to be maintained/possible hours to be maintained)).

Incidentally, in the configuration of item [2] where the virus inspection of the control section to be used by the job is performed before executing the job, instead that the virus inspection for the control module is performed every time before execution of the job, the virus inspection with respect to the control section is omitted before executing the job which starts execution in the predetermined period after confirming that the control module is not infected by the virus via the virus inspection for the control module and the virus inspection is performed every time before the job which starts execution after the predetermined times has been elapsed. In the configuration of item [3], where the virus inspection is performed for the control modules used for the job after executing the job, instead that the virus inspection for the control module is performed, for example, every time after execution of the job, the virus inspection is omitted after execution of the job of which execution has been terminated in the predetermine period after confirming non-infection of the virus via the virus inspection for the control module, and the virus inspection is performed each time after execution of the job of which execution is terminated after the predetermine period has been elapsed.

As above, by omitting the virus inspection for the a predetermined period, the number of the jobs which delay to start is reduced compared to the case where the virus inspection is performed every time after or before executing the job.

[7] The job processing system of item 2, wherein execution of a first job, which uses the control modules which have not been confirmed being not infected by the computer virus via the virus inspection among the plurality of the control modules, is held, and execution of a second job, which uses only the control modules which have been confirmed being not infected, is started.

In the above embodiment, execution of the job, which uses the control modules not having confirmed being not infected by the virus inspection, is held and execution of the job, which uses only the control modules having been confirmed being not infected by the virus, starts.

[8] The job processing system of item 1, wherein execution of a first job, which uses the control modules which have not been confirmed being not infected by the computer virus via the virus inspection among the plurality of the control modules, is held, and execution of a second job which does not use the control modules which have not been confirmed being not infected is started.

In the above embodiment, execution of the job, which uses the control modules, not having been confirmed not to be infected is held and execution of the job, which does not use the control modules not having been confirmed not to be infected by the virus, starts.

[9] The job processing system of claim 7, wherein the first job is executed by interrupting execution of the second job when all the control modules used for execution of the first job are confirmed being not infected by the computer virus, in case the first job has a higher priority than that of the second job.

In the above embodiment, the all the control modules used for the job being held are confirmed being not infected by the computer virus in the course of execution the job, and in case the job being held has the higher priority than that of the job in the course of execution, the job in the course of execution is interrupted and the job being held is executed. Whereby, when the job being held becomes executable, the above job and the job having the higher priority among the jobs in the course of execution can be executed on a priority basis.

[10] The job processing system of item 7, wherein execution of the second job is completed without being interrupted by execution of another job.

In the above embodiment, the job having started execution completes execution without being interrupted, even if the job being held having the higher priority becomes executable. The job which became executable starts execution after completion of execution of the job which starts execution before hand. Thus the control to manage execution order of the jobs can be simplified.

[11] An image processing apparatus included in the job processing system of item 1 to execute the job as a job related to image data, wherein the inspection control section makes an inspection section outside of the image processing apparatus to perform the virus inspection.

In the above embodiment, the inspection control section of the image processing apparatus requests an external inspection section to inspect whether or not the plurality of the control modules in the said apparatus are infected, for example, the external server provided with the inspection section having a function of the virus inspection. An external detection section having received the request of the virus inspection form the image processing apparatus performs the virus inspection, for example, for each of some control modules among the plurality of modules in case of items [1] and [2], and for each the control module used for one job in case of item [3]. As above, in the image processing apparatus which requests the external detection section to perform the virus inspect for the plurality of the control modules in the apparatus, the effect to job processing due to the virus inspection is suppressed and the reduction of the productivity can be suppressed.

BRIEF DESCRIPTION OF THE DRAWINGS

These and other objects, advantages and features of the invention will become apparent from the following description thereof taken in conjunction with the accompanying drawings in which.

DETAILED DESCRIPTION OF PREFERRED EMBODIMENTS

Embodiments will be described based on the drawings.

First Embodiment

Figure 1:
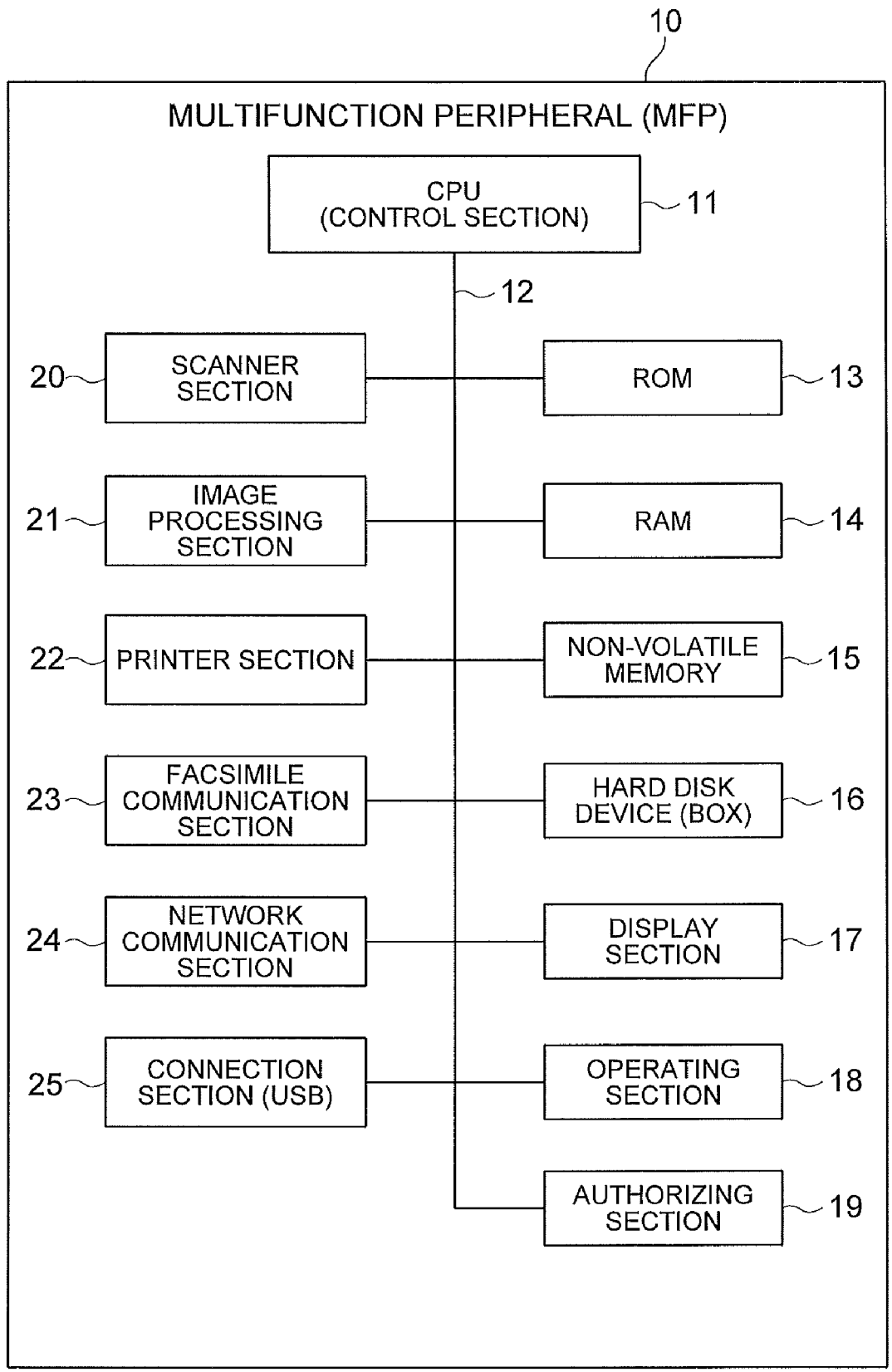
FIG. 1 is a block diagram showing a schematic configuration of a multifunction peripheral representing an image processing apparatus related to a first embodiment of the present invention.

FIG. 1 is a block diagram shows a schematic configuration of a multifunction peripheral (Multifunction Printer; MFP) 10 representing an image processing apparatus related to a first embodiment of the present invention.

The multifunction peripheral 10 is provided with a copying function to optically read a document image and to print and output the duplicate of the image thereof on a recording sheet; a scanner function to store image data (scan data) of the document having been read as a file, and to transmit the file to a terminal configured with a personal computer (PC) and a server, a printer function to print and output an image related to print data received from the document image, and the image related to image data (file) stored in the multifunction peripheral 10 on the recording sheet; a facsimile function to transmit and receive image data (facsimile data); an e-mail function to transmit and receive an e-mail; and a box function to store various kinds of image data in a box (folder) i.e. a memory area reserved for data storage. The various kinds of image data stored in the box are scan data, print data, facsimile data having been received, image data (file) attached to the e-mail, and image data (file) inputted by connecting an external memory device such as USB (Universal Serial Bus) memory.

The multifunction periphery 10 is provided with a plurality of control modules to correspond with the plurality of the aforesaid functions (processing functions), and a function to execute a plurality of inputted jobs related to the plurality of the functions while controlling a sequence of execution. The control model controls each section to execute processes related to job execution in accordance with a program. Each of sections to be operated and the control modules to be operated to control each of the sections are different in accordance with kinds of the job (process function to be used). The plurality of the control modules have configurations of different combinations of the plurality of the modules or one module. When a job is executed, a control module corresponding to the job operates so as to execute control related to job execution.

The multifunction peripheral 10 is provided with a function to inspect, detect and remove the computer virus exists in the own peripheral; a function to inspect, detect and remove the computer virus for each control module (each control module in some of the control modules in a plurality of the control module) used in one job; a function to permit execution of a job (the modules which have not been subject to the virus inspection and removing are not used) which uses control modules which has been subject to the virus inspection and removing, and to prohibit (holds or waits) execution of a job which uses control modules which have not been subject to virus inspection and removing; and a function to omit the virus inspection for a predetermined period of time after completion of the virus inspection and virus removing with respect to the control models having been subject to virus inspection and removing and to identify the said control models that the control modules have been confirmed that the virus has not infected the modules at least for the predetermined period of time. The predetermined time is configured with time of using the control module (operation time), and the virus inspection is omitted until the time of using the control module reached to a predetermined time.

Specifically, there are provided with a function to conduct the virus inspection with respect to the control module used for execution of the job before the job is executed and in case a virus is detected, the virus is removed; and a function to omit the virus inspection until the time of using the control module reaches to the predetermined time and a function to hold execution of a first job which uses a control module which is in the course of the virus inspection or removing the virus and to start a second job which uses only the control modules which are not in course of the virus inspection or removing the virus. Further, there is provided a function (interruption function) to interrupt a second job and execute the first job when the virus inspection and removing of the control module used for the first job execution are completed while the second job is being executed, and in case the first job is prior to the second job.

The multifunction peripheral 10 is configured by connecting a CPU (Central Processing Unit) 11 with a ROM (Read Only Memory) 13, a RAM (Random Access Memory) 14, a non-volatile memory 15, a hard disk device 16, a display section 17, an operation section 18, an authentication section 19, a scanner section 20, an image processing section 21, a printer section 22, a facsimile communication section 23, a network section 24 and a connection section 25 via a bus 12.

The CPU 11 controls operation of the multifunction peripheral 10 based on a program stored in the ROM 13. The RAM 14 is used as a work-memory to store various kinds of data temporally when the CPU 11 executes the program. Besides, the RAM 14 is used as an image memory to store the image data temporally.

The non-volatile memory 15 to retain records even when the power is turned off stores information unique for a device, various kinds of setting information, user authentication information, and virus identification files used for virus inspection (virus check). The hard disk device 16 stores various kinds of stored data and various kinds of image data. In the hard disk device 16, a box to store the image data (an area to store the data) is provided. Incidentally, the virus definition files can be stored in the hard disk device 16 instead of the non-volatile memory 15.

The virus definition file is a file (pattern file) storing particulars (specific patters) of the computer viruses to be used for detecting the computer viruses. The virus definition file is renewed as needed by the multifunction peripheral by accessing a dedicated server.

The display section 17 is configured with a liquid crystal display and so forth to display various screens such as an operation screen, a setting screen, a confirmation screen and a notification screen. The operation section 18 is configured with various kinds of buttons such as a start key, a stop key and ten keys and a touch panel to detect a pressed coordinate position provided on a surface of the liquid crystal display so as to receive various kinds of operations which a user conducts with respect to the multifunction peripheral 10.

The authentication section 19 identifies and authorize the user by comparing the authentication information inputted by the user and the authentication information stored in the multifunction peripheral 10 for verification.

The scanner section 20 acquires image data by reading a document optically. The scanner section 20 is configured with, for example, a light source to radiate light on the document, a line image sensor to read the document in a width direction by one line by receiving the reflected light, a moving device to subsequently move a reading position per line in a longitudinal direction of the document, an optical path configured with a lens and a mirror to form an image by leading the reflected light from the document to the line image sensor and a conversion section to convert an analogue image signal outputted form the line image sensor into digital image data.

The image processing section 21 conducts various kinds of image processing such as image correction, rotation, magnification/contraction, and compression/expansion.

The printer section 22 forms an image based on the image data via an electrophotographic process and outputs on a recording sheet. The printer section 22 is configured as a so-called laser printer provided with, for example, a conveyance device of the recording sheet, a photoconductive drum, a charging device, a LD (Laser Diode) subject to on/off controlled in accordance with the image data to be inputted, a scanning unit to scan the laser beam emitted from the LD on the photoconductive drum, a developing device, a transfer separation device, a cleaning device and a fixing device. The printer section 22 can be a LED printer which radiates LED (Light Emitting Diode) light instead of the laser beam onto the photoconductive drum or can be a printer of another method.

The facsimile communication section 23 receives and transmits image data via a public line with an external device provided with a facsimile function. The network communication section 24 communicates with a terminal device and a server via a network such as a LAN (local Area Network). The connection section 25 is connected with portable memory devices such as USB memories and various kinds of card type memories, and external memory devices such as an optical magnetic device and a hard disk.

Figure 2:
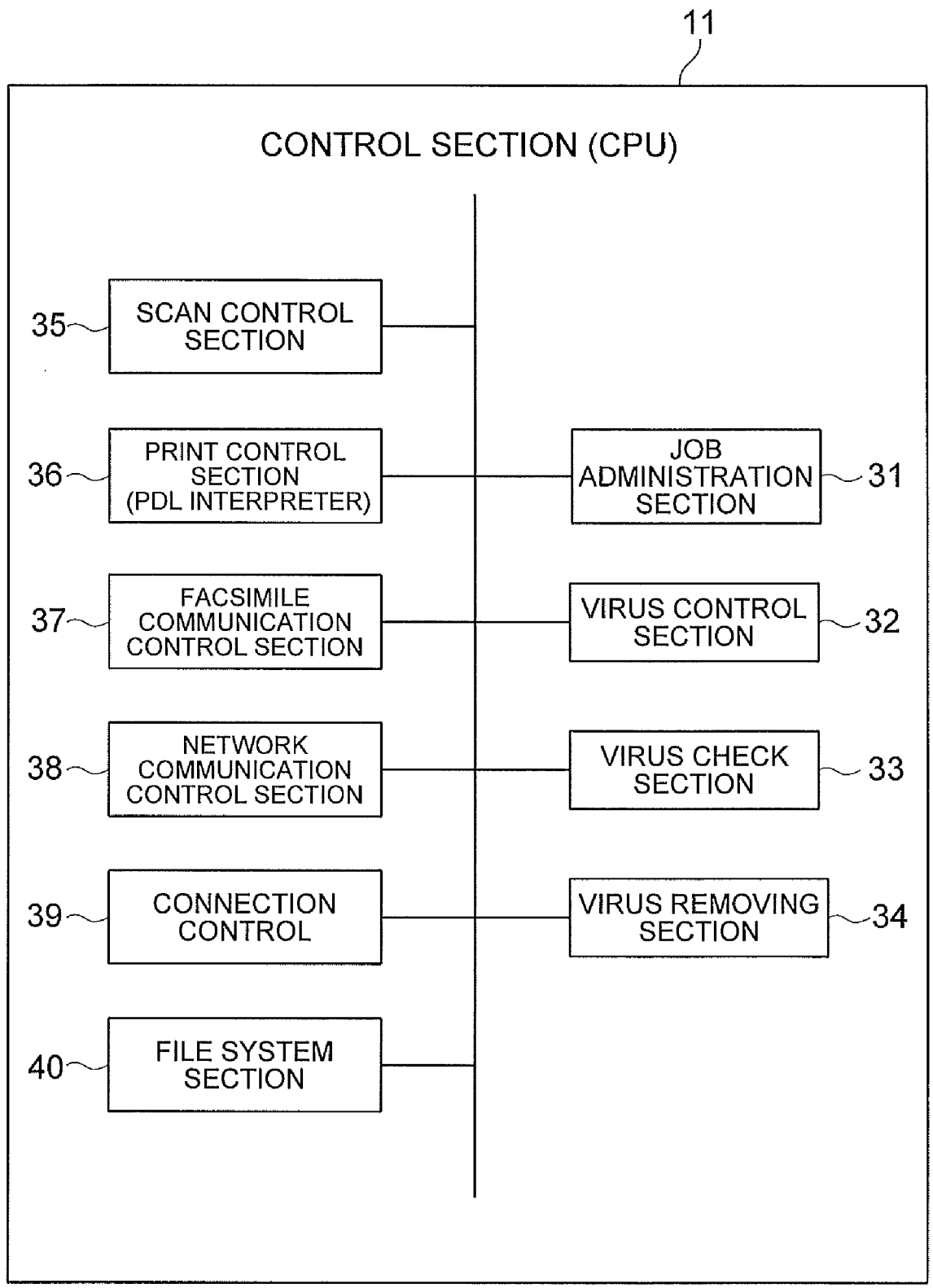
FIG. 2 is a block diagram showing a functional configuration of a control section in a multifunction peripheral.

FIG. 2 is a functional block diagram showing a functional configuration in the CPU 11 representing a control section. The control section (CPU11) is provided with a job administration section 31, a virus control section 32, a virus check section 33, a virus removing section 34, a scan control section 35, a print control section 36, a facsimile communication control section 37, a network communication control section 38, a connection control section 39 and a file system section 40. From the job administration section 31 to the virus removing section 34 shown on the right side in the figure is the functional block configuring a functional section of the control section. The functional section in the control section is separated into four functional blocks by the functions. From the scanning control section 35 to the file system section 40 shown on the left side in the figure represent control modules of the present embodiment.

The job administration section 31 serves as a main controller (admission section) for to job processing which conducts administration of creation, execution and an order of priority (priority level) of the job. Administration for execution and the order of priority of the job is conducted by a job cue. The job cue instructs the control module corresponding to the job to execute control. Information showing correlation between the jobs and the control modules (a plurality of kinds of the jobs and a plurality of kinds of the control modules) is stored in an unillustrated relation table. The job control section 31 identifies the control module corresponding to the job with reference to the relation table.

The scanning control section 35 serves to control operation of the scanner section 20 in accordance with a program when a scanning job or a copying job is executed and to control an output of image data from the scanner section 20 acquired through the scanner section 20 by reading the document.

The print control section 36 serves to control operation of the printer section 22 in accordance with the program when a print job is executed and serves as a PDL interpreter to conduct data conversion processing where print data in a page description language (PDL) received from a terminal device is converted to a bit map data.

A facsimile communication control section 37 serves to control operation of the facsimile communication section 23 in accordance with the program when a facsimile job (transmission/reception job) is executed and serves to control an output from the facsimile communication section 23 which is the image data received by the facsimile communication section 23.

The network communication control section 38 serves to control operation of the network communication section 24 in accordance with the program when a PC print jog is executed (when print data is received from an external device) or a transmission/reception job of the image data attached to an e-mail is executed and serves to control an out put of data from the network communication section 24 which is received by the network communication section 24.

The connection control section 39 serves to control operation of the connection section 25 in accordance with the program when a file (image data) is exchanged with an external memory device (USB memory and so forth) connected to the connection section 25 and serves to control an output of the file, which the connection section 25 has received from the external memory section, from the connection section 25.

The file system section 40 serves to conduct file (image data) administration in the hard disk device 16, specifically such as memorizing, changing (renewing), moving and deleting a file. While a storing job (box storing job), to store the file in a box in the hard disk device 16, is executing, the file system section 40 serves to sort the file in the box in accordance with the program.

The virus control section 32 serves to conduct administration of a virus check and virus removing with respect to programs (programs of the control modules are included) in the multifunction periphery 10. In administration of the virus check/removing of the control modules, an instruction of execution of the virus check/removing with respect to the virus check section 33 and the virus removing section 34, confirmation of the result thereof (reception of completion report) and notification of completion to the job administration section 31 are conducted.

The virus check section 33 serves to conduct the virus check with respect to programs and data in the multifunction peripheral 10 using a virus definition file in accordance with a virus check program. Further, the virus check section 33 is provided with a function to execute the virus check respectively with respect to the plurality of the control modules (program of each control module) from the scan control section 35 to the file system section 40. The virus check is conducted using a method such as pattern matching to detect a computer virus by verifying the virus with a virus definition file.

The virus removing section 34 serves a function to remove the detected computer virus in accordance with the virus removing program. Further, the virus removing section 34 is provided with a function to execute virus removing respectively with respect to the plurality of the control modules from the scan control section 35 to the file system section 40 (the computer virus infecting the control module).

As described above, the job administration section 31 carries out administration on to job execution by the job cue. The jobs are divided broadly into large categories such as a printing family job (job related to printing), a transmission family job (job related to transmission) and a storing family job (job related to storing) by the kinds of data output destinations and further divided finely into small categories by the kinds of data input sources. A plurality of the job cues are provided for the large categories respectively. The job types to be administrated by each kind of the job cue, data input sources and data output destinations will be described as follow.

The scanner section 20, the facsimile communication section 23, the network communication section 24, the connection section 25 and the box of the hard disk device 16 shown in FIG. 1 are data input sources to input the image data. Also, the printer section 22, the facsimile communication section 23, the network communication section 24, the connection section 25 and the box of the hard disk device 16 are the destinations to which the image data is outputted. In the above case, the box is a data output destination when the inputted image data (file) is stored.

Figure 3:
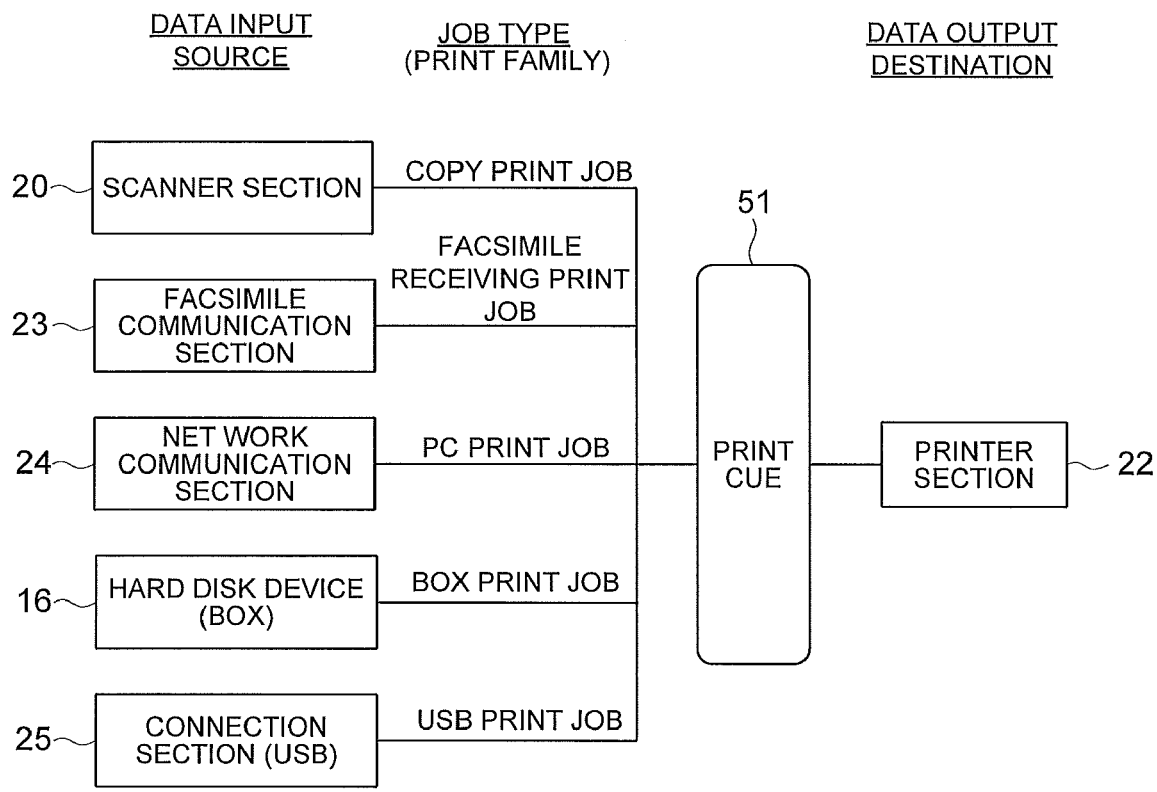
FIG. 3 is a diagram showing a source of data input, a job type and a data input destination of a job related to transmitting administrated by a print cue of a multifunction periphery.
Figure 4:
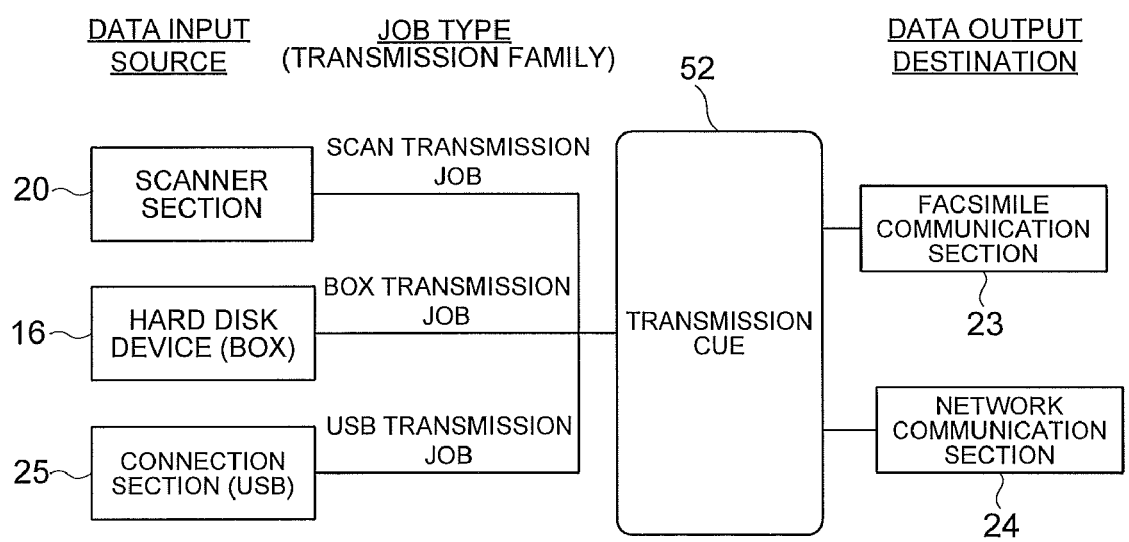
FIG. 4 is a diagram showing a source of data input, a job type and a data input destination of a job related to transmitting administrated by a transmission cue of a multifunction periphery.
Figure 5:
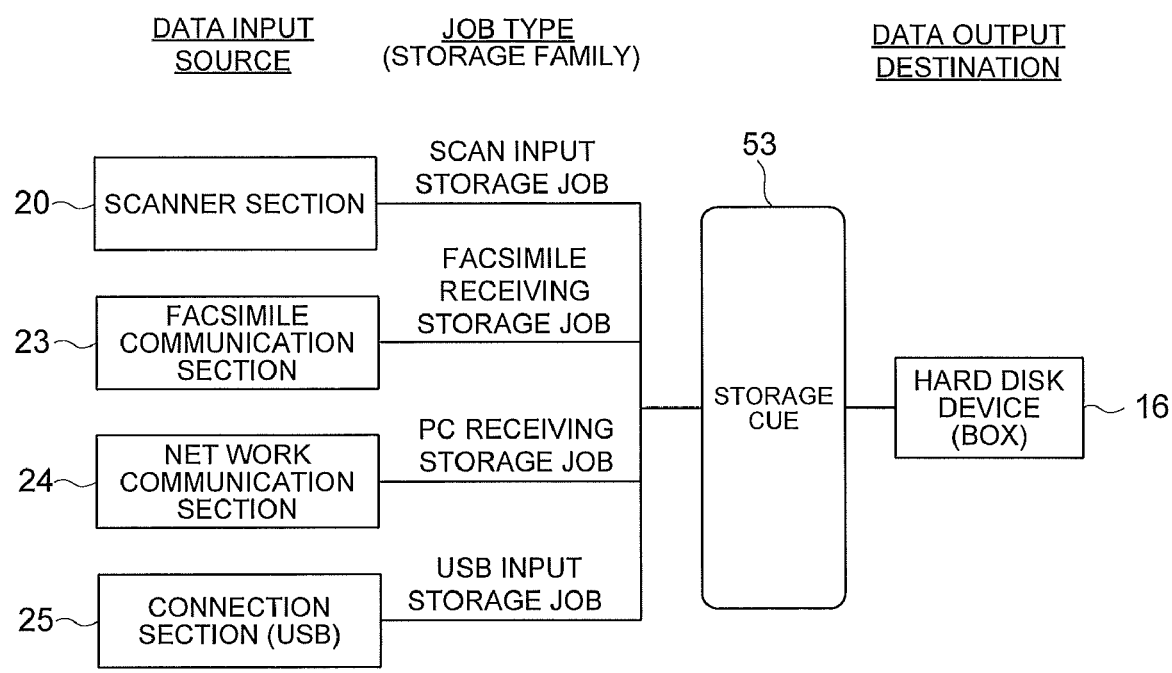
FIG. 5 is a diagram showing source of a data input, a job type and a data input destination of a job related to storing administrated by a storing cue of a multifunction periphery.

FIGS. 3 to 5 show relations between the job types, in which data input sources and data output destinations are combined, and the job curs to administrate each type of jobs.

FIG. 3 is a diagram showing the data input source of the print family job (XX print job) administrated by a print cue 51, the job type, and the data output destination. The print family job conducts printing processing of the image data and the output destination of the image data is the printer section 22.

Detailed categories (job types) of the printing family job are a copy print job to conduct print processing of the image data inputted by scanning the document through the scanner section 20 where the scanner section 20 is a data input source; a facsimile reception print job (fax reception print job) to conduct print processing of the image data received by the facsimile communication section 23 from the other communication apparatus where the facsimile communication section 23 is the data input source; a PC print job to conduct print processing of print data (image data) received from a terminal device (PC) via a network where the network communication section 24 is the data input source; a box print job to conduct print processing of the image data inputted from the box where the box in the hard disk device 16 is the data input source; and a USB print jog to conduct print processing of the image data inputted from the USB memory connected to the connection section 25 where the connection section 25 is a data input source.

In the copy print job, box print job and USB print job, the multifunction peripheral 10 receives instructions of job setting and execution from a user via the display section 17 and the operation section 18. When receiving input instruction of job via the user's operation, the job administration section 31 discriminates the job types (scan (copy)/box/USB+print) according to contents of setting and creates the job based on setting and registers the job in the print cue so as to conduct administration for execution.

In the facsimile reception print job and the PC print job, information indicating the job type is attached to incoming job data. The job administration section 31, when the job is received by the above reception, discriminates the job type (i.e. facsimile reception or PC+print) in accordance with information attached to the job data received and registers the job in the print cue 51 for administration for execution.

FIG. 4 is a diagram showing data input sources of the transmission family job (XX transmission job) administrated by the transmission cue 52, the job types and the data output destinations. The transmission family job is a job to conduct facsimile transmission processing of the image data and mail transmission processing, and the output destination of the image data is the facsimile communication section 23 or the net work communication section 24. Incidentally, in the transmission family job, one job can conducts facsimile transmission and mail transmission for the same image data simultaneously.

The transmission family jobs are specifically categorized as the following job types i.e. a scan transmission job to conduct transmission processing of an image data which is obtained and inputted by the scanner section 20 to scans a document, where the scanner section 20 represents data input source; a Box transmission job to conduct transmission processing of the image data inputted from the BOX where the hard disk device 16 represents the data input source; and the USB transmission job to conduct transmission processing of the image data inputted from the USB memory connected to the connection section 25.

In the transmission family job, the multifunction periphery 10 receives instructions of setting and execution of a job from a user via the display section 17 and the operation section 18. When receiving input instruction of job via the user's operation, the fob administration section 31 discriminates the job type (scan, Box, or USB+transmission) according to contents of setting and create the job based on the setting, and registers the job in the transmission cue 52 to administrate execution.

With respect to the facsimile receipt print job and the PC print Job, information indicating the job type is attached to incoming job data. When receiving a job input through the above reception, the job administration section 31 discriminate the job type (facsimile reception, PC+print) in accordance with the information attached to the incoming job data, and registers the job in the transmission cue 52 to administrate execution.

FIG. 5 is a diagram showing a data input source of the storing family job (XX storing job) administrated by the storing cue 53. The storing family job is a job to conduct storing processing (box storing processing) of the image data, and the output destination of the image data is the box in the hard disk device 16. Meanwhile, the storing family job includes external memory storing processing (USB storing processing) of the image data In case of the above job, the output destination of the image data is the connection section 25, for example, the USB memory connected to the connection section 25.

The storing family jobs are specifically categorized as the following job types i.e. a scan input storing job to conduct storing processing of the image data which is obtained by scanning the document via the scanner section 20 and inputted; a facsimile reception storing job (Fax reception storing job) of the image data received by the facsimile communication section 23 from another communication apparatus on the other side of communication where the facsimile communication section 23 represents the data input source; and a USB input storing job to conduct storing processing of the image data inputted from the USB memory connected with the connection section 25, where the connection section 25 is the data input source.

In the scan input storing job and the USB input storing job, the multifunction peripheral 10 receives an instruction of setting and execution of the job from the user via the display section 17 and the operation section 18. When receiving an input of the job by the user's operation, the Job administration section 31 discriminates the job type (scan input or USB+ storing) and creates the job based on the setting then registers the job in the transmission cue 53 to administration execution.

With respect to the facsimile receipt print job and the PC print Job, information indicating the job type is attached to an incoming job data. When receiving the job input through the above reception, the job administration section 31 discriminates the job type (facsimile reception or PC reception+storing) and registers the job in the transmission cue 53 to administrate execution.

Next, an operation of the multifunction peripheral 10 will be described.

In the multifunction peripheral 10, the job administration section 31 of the control section (CPU11) conducts administration to register the inputted job in the job cue and executes the job in accordance with a registration order (input order). Specifically, the job administration section 31 categorizes the inputted jobs into a print family, a transmission family and a storing family. The printing family job is registered in the printing cue 51 and administrated to be executed in a registration order. The transmission family job is registered in the print cue 52 and administrated to be executed in the registration order. The storing family job is registered in the print cue 53 and administrated to be executed in the registration order. Also, the job administration section 31 determines an order of priority among the jobs registered in different job cues in accordance with the order of registration.

In the present embodiment, the job administration section 31 categorizes the inputted jobs into three and distributes to three cures to be registered and administrated. However, in practice, all the jobs are registered in one job cue and administrated and to be executed in the registration order (input order). In the following description as to an operation of the multifunction peripheral 10 (Job administration section 31), administration for job execution using three job cues is described as administration that the job is administrated by one job cue without distinguishing the job by each job cue.

Also, before executing the job, the virus control section 32 judges whether or not the virus check is executed based on a state of the virus check and removing (in the course of execution or not in the course of execution) or number of times of using the control module, with respect to the control module used for executing the job.

The number of times of using the control module is counted by an unillustrated execution counter provided for each control module. Here, an initial value of the execution counter is set at "0" and the execution counter corresponding to the control module used for executing the job is incremented by one every time the job is executed, whereby the number of times of using the control module is counted. If the count value of the execution counter is smaller than a predetermined value A, the virus check is judged to be not necessary and if it is greater than the predetermined value A, the virus check is judged to be necessary. The execution counter is reset at "0" when the virus check and removing of the corresponding module is completed.

Also the job administration section 31 allows the control module used for the job (job type) to start execution of the job when the virus control section 32 judges that the virus check is not necessary at this stage, and instructs the control module to conduct control to execute the job (job execution start). In case the virus control section 32 judges that the virus check is currently necessary for the control model, the job administration section 31 holds execution of the job which uses the control module (queuing job). In the above case, the virus control section 32 instructs the virus check section 33 to conduct the virus check for the control module (start execution of the virus check). In case infection of the virus is detected, the virus control section 32 instructs the virus removing section 34 to conduct virus removing with respect to the control module (start execution of virus removing).

Also, in case the virus control section 32 judges that the control module to be used for the job is in the course of the virus check or virus removing at this stage, the job administration section 31 also holds execution of the job which uses the control module (queuing job).

The job administration section 31 release holding in case the virus control section 32 judges that the virus check or virus removing for all modules to be used for the job (succeed removing) has been completed. Also in case the virus can not be removed, the virus control section 32 prohibits use of the control module and eliminates all the jobs, which use the control module, from the job cue. In the above case, a notification is sent to an administrator and the user who inputted the job.

The states of the job i.e. waiting or not waiting are controlled by using a queuing job flag. The state of virus check i.e. in the course of removing or not in the course of removing (state of job executable or not executable) is controlled using a job execution disable flag).

When the queuing job occurs, if the jobs to be executed using only the control module in which the virus control section 32 judged the virus check is not necessary, exists in the job cue, the job is allowed to be executed in the registration order and execution starts. While the above job is being executed, in case the virus check or virus removing is completed with respect to all the control modules to be used for the queuing jobs having higher priorities than that of the said job, holding of the queuing jobs are released and execution is permitted, then the job in the course of execution is interrupted and the execution of the queuing jobs start (interrupt control). The job interrupted by the interruption of other jobs start execution after completion of the interrupting job.

The operation of the above mentioned job administration section 31 and the virus control section 21 will be described specifically as follow.

Figure 6:
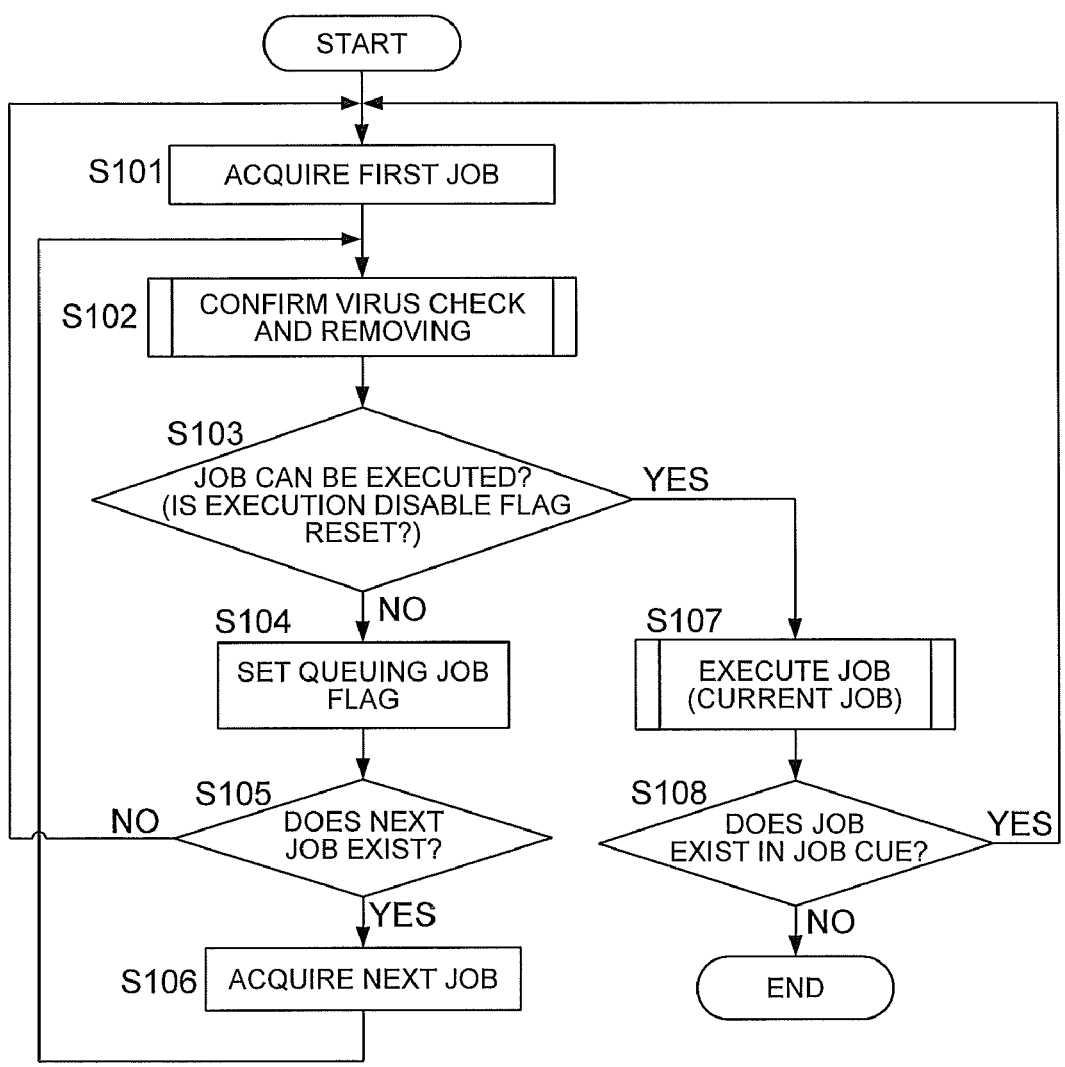
FIG. 6 is a flow chart showing operation of administration related to job execution by a virus control section in a control section of a multifunction peripheral.

FIG. 6 is a flow chart showing an operation of administration related to execution of the job by the job administration section 31. In the present operation, the job is inputted in a state that the job is not registered in the job cue, and execution starts when the job is registered in the job cue. Also, when execution of all the jobs registered in the job cue is completed and the jobs are deleted from the job cue, and when the jobs to be administrated are eliminated from the job cue and disappear, the operation is completed.

When the present operation starts, the job administration section 31 acquires a first job registered in the job cue (a first job in the registration order) (step S101) and instructs the virus control section 32 to confirm the virus check and removing (step S102). The virus administration section 32 starts to confirm the virus check and removing on reception of the instruction.

Figure 7:
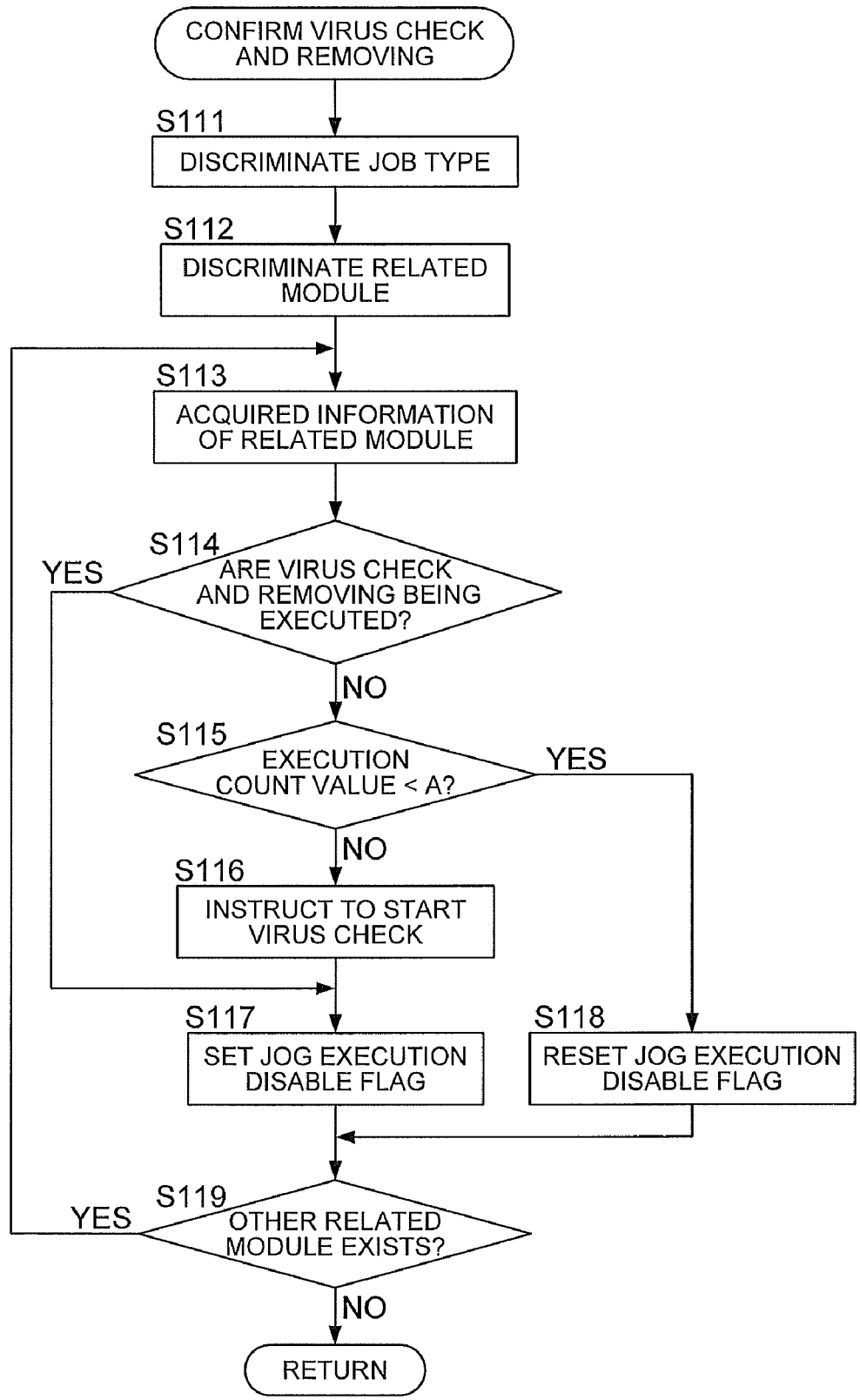
FIG. 7 is a flow chart showing operation of a virus check and confirmation of removing by a virus control section in a control section of a multifunction peripheral.

FIG. 7 is a flow chart showing an operation to confirm the virus check and removing via the virus control section 32.

When the present operation starts, the virus control section 32 identifies the job type which the job administration section 31 acquired from the job cue (step S111). For example, the job administration section 31 notifies information of the job type in accordance with the instruction of the virus check and removing. Or the virus control section 32 requests the information of the job type to the job administration section 31 and receives the information so as to identify the job type.

Further, the virus control section 32 identifies the control module (the control module used for executing the said job) corresponding to the identified job type (step S112). As described above, the job administration section 31 identifies the control module corresponding to the job with reference to a relation table in which the information indicating correspondences between the jobs and the control modules are stored. Here, for example, the job administration section 31 notifies information of the control module in accordance with the instruction of the virus check and removing. Or the virus control section 32 requests the information of the control module to the job administration section 31 and receives the information so as to identify the control module related to the job type. The control module corresponding to the job may be abbreviated as "corresponding module" in the following.

Next, the virus control section 32 acquires information about the identified corresponding module (step S113). The information acquired here is information of whether or not the corresponding module is in the course of the virus check or removing and a counter value of an execution counter corresponding to the corresponding module. Information related to a state of the virus check and removing is controlled by the virus control section 32. Specifically, the virus check and removing is judged to be in a course of execution until the virus control section 32 receives completion report of the virus check and removing which the virus control section 32 instructed to the virus check section 33 and virus removing section 34 to execute. Details of an execution instruction of the virus check and removing and the count value of the execution counter will be described later.

Usually, at least two corresponding modules exist for one job i.e. data input source side corresponding module and the data output side corresponding module. The virus control section 32 acquires information regarding one corresponding module which has not been checked among a plurality of the corresponding modules to be used for the job.

In case the corresponding module is not in the course of virus removing (step S114; No.) and the count value of the execution counter is less than the predetermined value A (step S115; Yes), the virus control section 32 resets the job execution disable flag (step S118) and proceeds with step S119.

The job execution disable flag is a flag respectively provided for the jobs showing whether or not the jobs are executable. The flag in a reset state indicates that the job is not executable and a set state indicates the job is executable. The job execution disable flag is in the reset state at an initial stage.

In case the counter value of the execution counter is not less than the predetermined value A (step S115; No.) the virus control section 32 instructs the virus check section 33 to start the virus check with respect to the corresponding module (step S116), and set the job execution disable flag corresponding to the job (step S117), and proceeds with step S119. The virus check section 33 starts the virus check with respect to the corresponding module on receipt of the aforesaid instruction from the virus control section 32.

Also, in case the corresponding module is in the course of the virus check or removing (step S114;Yes), the virus control section 32 sets the job execution disable flag corresponding to the job (step S117 and proceed with the step S119.

In case another corresponding module exists (step S119; Yes), returning to the step S113 and steps thereafter are executed in the same manner. Incidentally, in case a plurality of the corresponding modules exist (usually, at least two corresponding modules exist i.e. the data input side and the data output side for one job), the job execution disable flag is reset in step S118 only in case all the corresponding modules are not in the course of the virus check or removing (step S114; No) and the counter value of the execution counter is less than the predetermined value A (step S115; Yes). Other than the above case, namely, if any of the corresponding modules is in the course of the virus check or removing (step S114; Yes.) or the count value of the execution counter is not less than the predetermine value A (step S115; No) the job execution disable flag is set.

In case not other corresponding module exists (step S119; No), the virus control section 32 terminates the present operation and notifies to the job administration section 31 that completion of the virus check and removing in the instruction is confirmed (Return).

Also, in step S116 of the present operation, when the virus control section 32 instructs the virus check section 33 to start the virus check with respect to the corresponding module, the virus check section 33 starts the virus check with respect to the corresponding module. When the virus check is completed, the virus check section 33 reports to the virus control section 32, whether or not the computer virus has been detected in the program of the corresponding module as a result of the virus check (virus check completion report).

Figure 8:
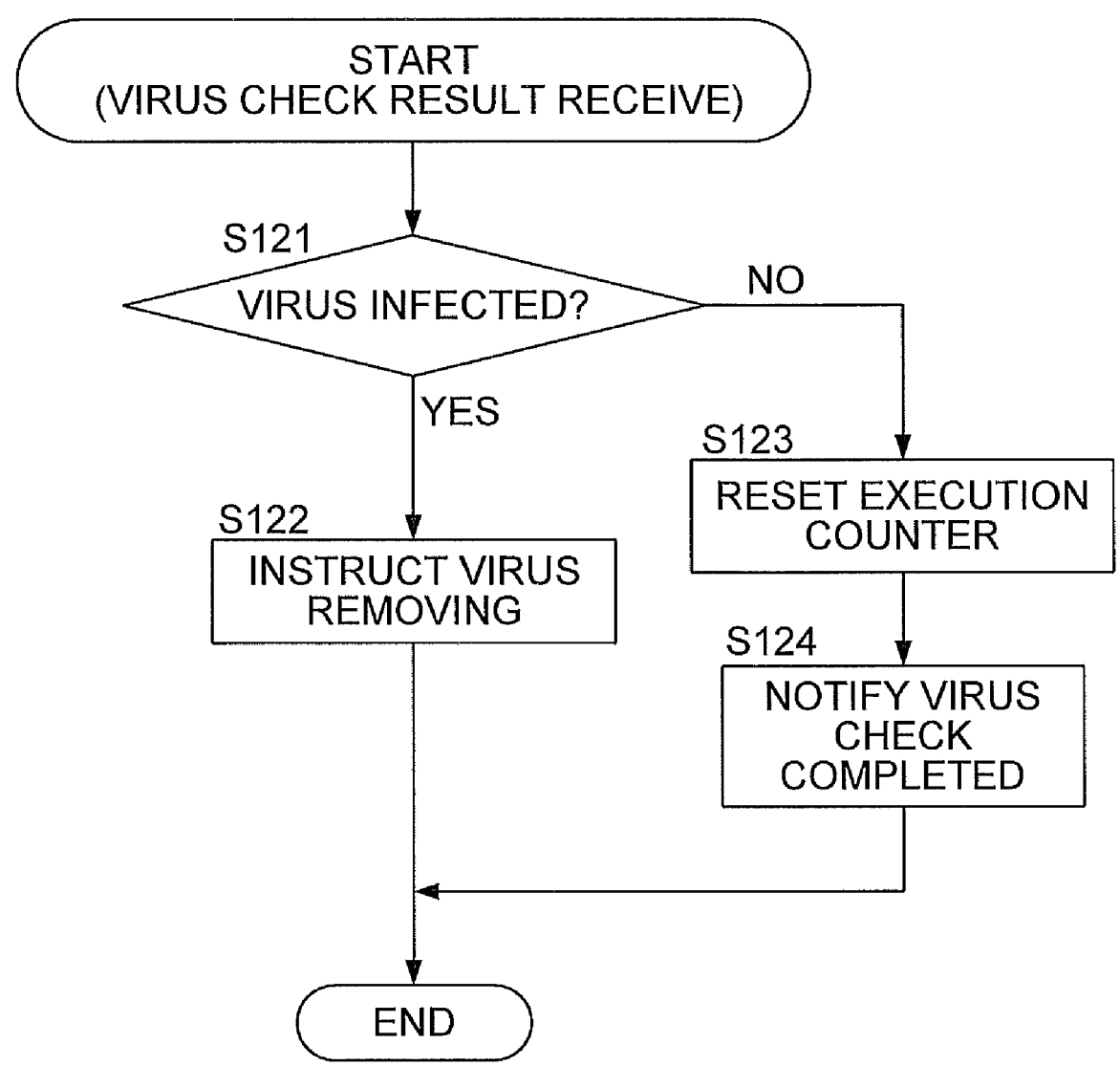
FIG. 8 is a flow chart showing operation of receiving a virus check result by a virus control section.

FIG. 8 is a flow chart showing an operation flow of virus check result reception which is carried out when the virus control section 32 receives the virus check result of the corresponding module reported from the virus check section 33. The virus control section 32 starts the present operation on receipt of the above report from the virus check section 33.

When a report of being not infected by the virus is received as a result of the virus check with respect to the corresponding module, the virus control section 32 resets the execution counter corresponding to the corresponding module (step S123) and notifies to the job administration section 31 that the virus check with respect to the corresponding module is completed (step S124/the virus check completion notification) and terminates the present operation.

When a report of being infected by the virus is received as a result of the virus check with respect to the corresponding module (step S121; Yes), the virus control section 32 instructs the virus removing section 34 to remove the virus with respect to the corresponding module (step S122) and terminates the present operation. The virus removing section 34 executes virus removing with respect to the corresponding module on receipt of the above instruction from the virus control section 32.

When virus removing is completed, the virus removing section 34 reports whether or not virus removing with respect to the corresponding module was successful, namely whether or not the computer virus detected in the program of the corresponding module has been removed is reported to the virus control section 32 as a result of virus removing (virus removing completion report).

Figure 9:
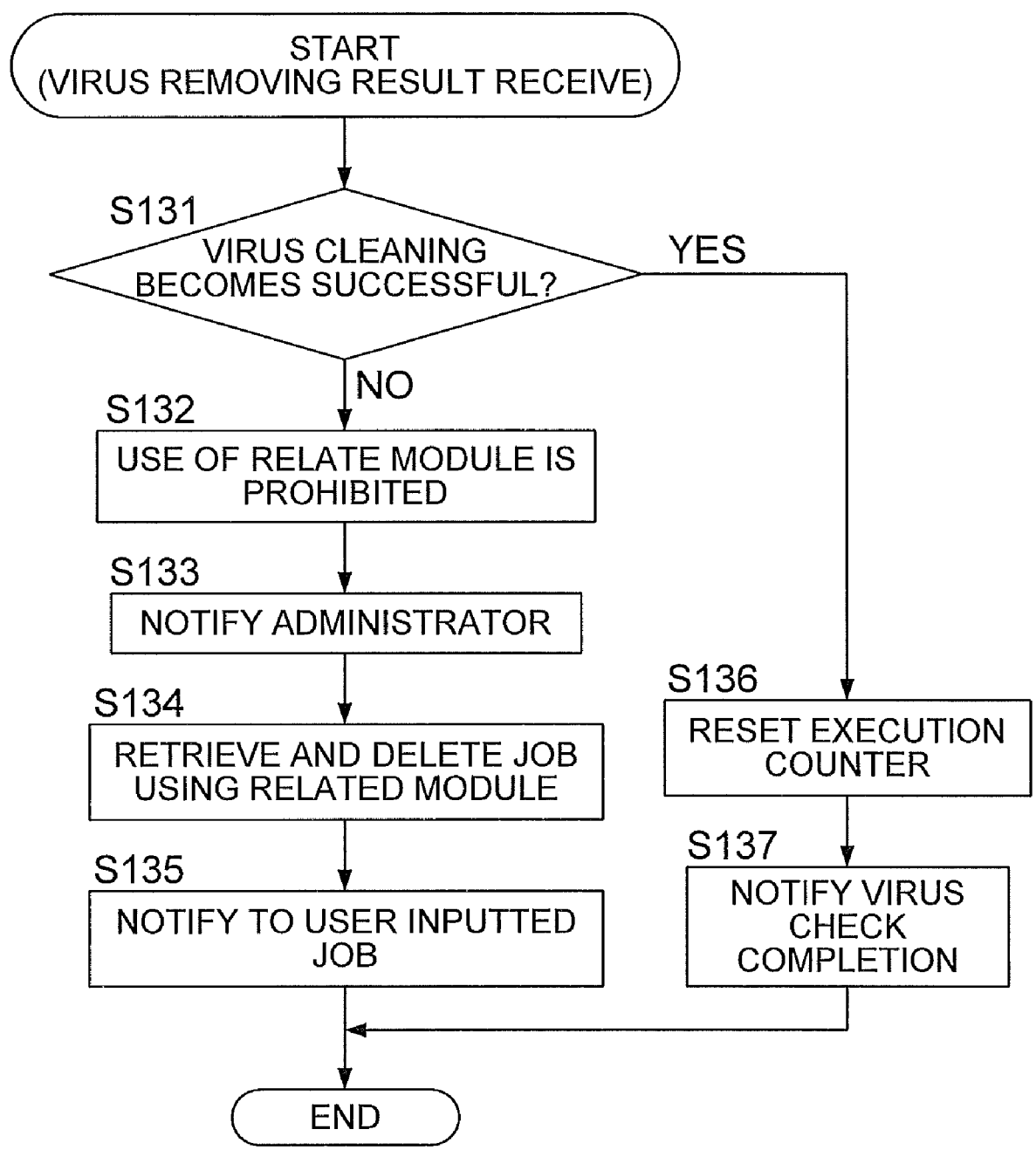
FIG. 9 is a flow chart showing operation of receiving a virus removing result by a virus control section.

FIG. 9 is a flow chart showing an operation flow of virus removing result reception which is carried out when the virus control section 32 receives the virus removing result of the corresponding module reported from the virus removing section 34. The virus control section 32 starts the present operation on receipt of the above report from the virus removing section 34.

In case a report of successful virus removing is received a result of virus removing with respect to the corresponding module (step S131; Yes), the virus control section 32 resets the execution counter with respect to the corresponding module (step S136), and notifies completion of the virus check (including successful virus removing) with respect to the corresponding module to the job administration section 31 (step S137/virus check completion notification) and terminates the present operation.

In case a report of faulty virus removing is received as a result of virus removing with respect to the corresponding module (step S131; No), the virus control section 32 prohibits use of the corresponding module (step S132), and notifies to an administrator (step S133). For example, an e-mail describing information of the corresponding module which is prohibited to be used because of a failure of virus removing and information of the computer virus of which removing is failed is sent to a terminal of the administrator to notify the administrator.

Also, the virus control section 32 is registered and controlled by the job cue. The job which uses the corresponding module is retrieved and deleted (step S134), and the user inputted the deleted job is notified of delete of the job (step S135) and the present operation is terminated. Notification to the user inputted the job is carried out, for example, by sending an e-mail in which the failure of virus removing of the corresponding module used to the inputted job and delete of the job which is not executable are described to the terminal of the user inputted the job.

At step S102 in FIG. 6, when the job administration section 31 receives notification of completion of the virus check and removing from the virus control section 32 ("return" in FIG. 7), whether or not the job is executable is judged based on the job execution disable flag (step S103). In case the flag is reset, the job is executable. In the above case, execution of the job is permitted and the job (current job) is executed in a sub-routine (step S107). Details of the present sub-routine will be described later.

Subsequently, the job administration section 31 confirms whether or not the job exists in the job cue (step S108). In case the job does not exist in the job cue (Step S108; No), the present operation is terminated (End). In case the job exists in the job cue, returning to step S101, steps after S101 are repeated for the first job in the job cue.

In the job execution judgment based on the job execution disable flag of step S103, the job administration section 31 judges that the job is not executable in case the flag is set (step S103; No). In the above case, execution of the job is held and a queuing job flag corresponding to the job is set (step S104) and proceed with the step S105.

The queuing job flag is a flag provided for each job indicating whether or not the job is in the queuing state or not. A flag reset state denotes a non queuing state and a flag set state denotes a queuing state. The queuing job flag is reset in the initial state.

Subsequently, the job administration section 31 confines whether or not a subsequent job exists in the job cue (step S105). In case the subsequent job does not exist (step S105; No), returning to step S101, steps after S101 are repeated with respect to the first job in the job cue. While steps S101 to s105 are being repeated, if reset of the job execution disable flag is confirmed, the job is judged to be executable. In the above case, holding of the job is released and execution is allowed, then the queuing job flag with respect to the job is reset and the operation proceeds to step S107 (job execution).

In case the subsequent job exists after holding the first job, or the subsequent job is registered in the job cue while steps S101 to S105 are being repeated in the holding state of the first job (step S105; Yes), the virus control section 32 acquires the job (step S106) and returning to the step S102 and the steps after S102 are executed for the job (FIG. 7).

Provided that the above job is the second job, the virus control section 32 judges whether or not the second job is executable based on the job execution disable flag corresponding to the job (step S103). In case of the flag reset state, it is judged to be execution disable and execution of the second job is held, then the queuing job flag corresponding to the job is set (step S104), and then whether or not subsequent job exists in the job cue is confirmed (step S105).

In case the subsequent job does not exist in the job cue, returning to the step S101, steps after the first step is repeated for the first job (first job of queuing job) in the job cue. Here, if the first job is executable (step S103; Yes), execution of the first job starts (from step S107). If the first job is not executable (step S103; No), via step S105; Yes and step S106, steps after step S102 are repeated for the second job in the job cue (second queuing job). Here if the second job is executable (step S103; Yes), execution of the second job starts (step S107). If the second job is not executable, (step S103; No) returning to step S101 via step S105, a judgment of execution disable sustains in an order of the first queuing job and the second queuing job.

When a new job, for example, a third job is registered in the job cue while the first and second jobs are in the holding state, confirmation of the virus check and removing (step S102) and execution of disable judgment (step S103) are carried out. If the third job is executable (step S103; Yes), execution of the third job starts (from step S107) and if it is not executable (step S103; No.) execution is held. (step S104). In case the third job is held, execution disable judgment sustains in an order of the first queuing job, the second queuing job and the third queuing job.

As above, in the present operation, the inputted job is registered in the job cue, and the execution order is controlled to execute the jobs in a registration order (an input order), then confirmation of the virus check and removing is carried out for the control modules to be used to execute the job (step S102), and then the execution availability is judged (step S103) based on the result of confirmation. The jobs unable to be executed are held not to be executed (queuing jobs) and the jobs able to be executed are executed in order. The virus check and removing confirmation and executable judgment are continued in the registration order for the queuing jobs, and as soon as the jobs become executable, execution starts.

Figure 10:
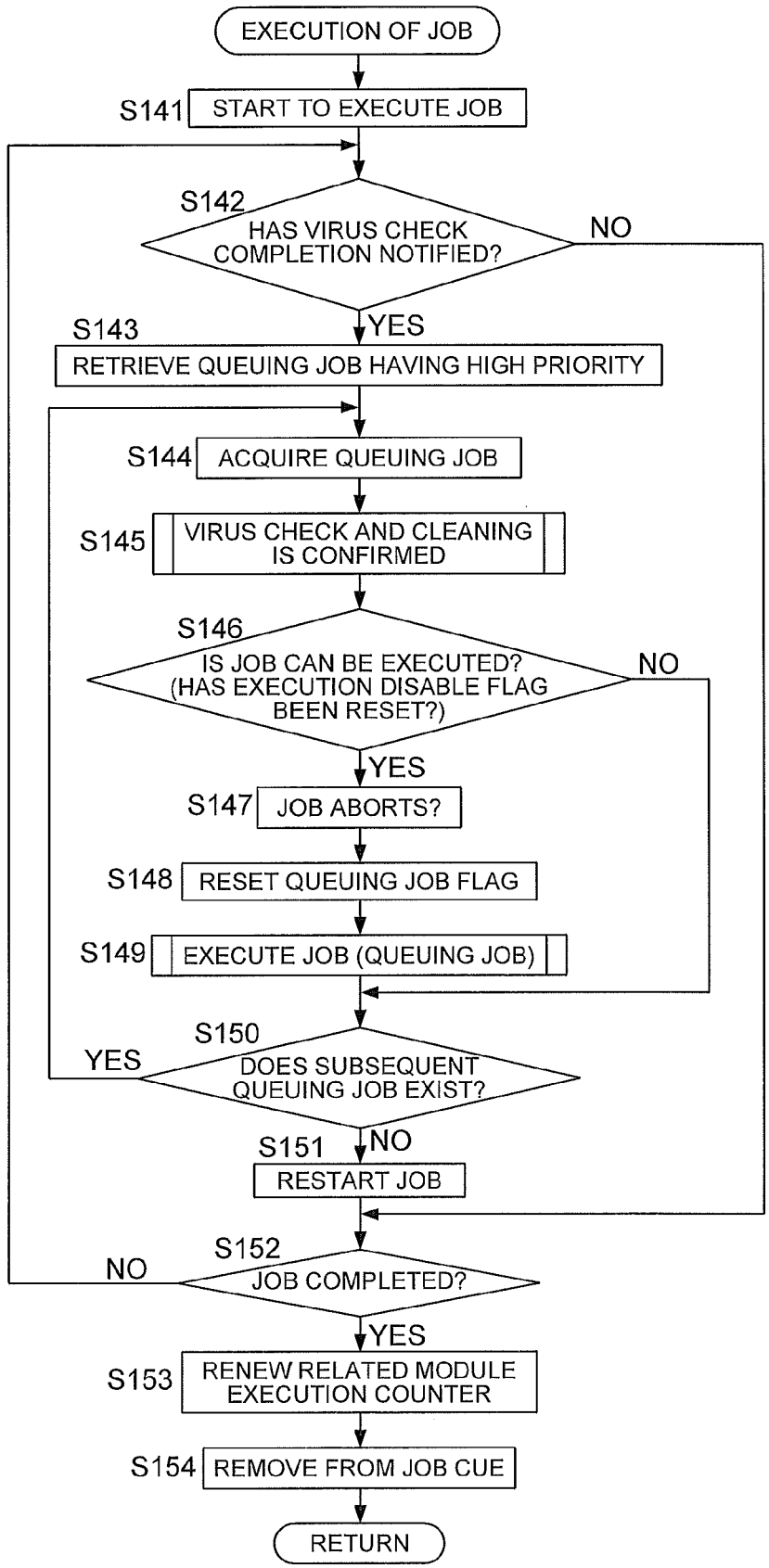
FIG. 10 is a flow chart showing a sub-routine to execute a job in FIG. 7.

FIG. 10 is a flow chart of a sub-routine of the step S107 (job execution) in FIG. 6.

When the sub-routine starts, the job administration section 31 judges the job to be executable in step S103 in the aforesaid FIG. 6 and execution of the job is allowed to be executed (step S141). Specifically, the job administration section 31 instructs execution of control related to the job processing with respect to the module corresponding to the job. The corresponding module (control module) having received the instruction starts a control operation related to the job processing and controls a corresponding block (processing section) in accordance with a program. The block started operation by receiving the control executes the job such as processing related to input and output of an image data.

The job administration section 31 proceeds with execution of the job (job processing) (step S152; No.) while watching (step S142; No) a virus check completion notification (step S124 in FIG. 8 or Step S137 in FIG. 9) from the virus control section 32 in the course of execution of the job. In case that the job is terminated (step S152; Yes) without receiving the virus check completion notification (step S142; No), the job administration section 31 renews an execution counter corresponding to all the corresponding modules (control modules) used in execution of the job by incrementing by one, (step s153), and eliminates the job form the job cue (step S154) then terminates the present sub-routine to returned to the main routine (Return→step S108 in FIG. 6).

In the course of job execution, in case the virus check completion notification is received from the virus control section 32, (step S142; Yes), the job control section 31 retrieves queuing jobs having higher priority than that of the job currently being executed (job registered in advance) among the jobs in the job cue (step S143). Subsequently, the job administration section 31 acquires a job having the highest priority (step S144) and instructs the virus control section 32 to confirm the virus check and removing (step S145). The virus administration section 32 starts the virus check and removing described in FIG. 7 on reception of the instruction, then sets (step S117) or resets (step S118) the job execution disable flag corresponding to the queuing job based on a state of the virus check and removing (executing/not executing) with respect to the module corresponding to the queuing job, and then when the present confirmation is terminated, the termination is notified to the job administration section 31 ("Return" of FIG. 7).

When completion of the virus check and removing is received from the virus control section 32, in step S145 of FIG. 10, the job administration section 31 judges whether or not the queuing job is executable based on the job execution disable flag (step S146). If the flag is set, it is judged to be "execution unable" (step s146; No) and continue holding of the queuing job.

Next, in case a subsequent queuing job having a higher priority than that of the job currently being executed does not exist in the job cue (step S150; No), the job administration section 31 proceeds with step S152 by passing step S151 and repeats steps after step S152 for the job currently being executed again. In case the subsequent queuing job exists in the job cue (step S150; Yes), returning to step S144, the job administration section 31 acquires the job having a next highest priority than that of the job currently being executed and proceeds with the steps after step S144 in the same manner.

In a judgment of ability of execution based on the job execution disable flag in step S146, if the flag is reset, the queuing job is judged to be executable (step S146; Yes), the queuing job is released from holding and execution thereof is allowed.

In the above case, the job administration section 31 interrupts the job currently being executed (step S147), and set a queuing job flag corresponding to the queuing job (step S148) then starts execution of the queuing job (step S149). In step S149, recursive call of the present job is performed. Whereby, the queuing job starts to be executed as an interrupt job and proceeds with step S141 onward in the same manner in accordance with operation of "job execution" of recursive call.

Also, in case the virus check completion is notified in the course of execution of the interruption job and in case a queuing job inputted in advance having the higher priority than that of the interruption job is judged to be executable, the interruption job is stopped and the queuing job starts to execute as an interruption job with respect to the interruption job (multiple interruption). In case a plurality of queuing jobs exist, the jobs are executed in order of priority to the utmost extend via the above interruption control.

When execution of the interrupt job (queuing job) in step S149 is completed, the flow advances to step S150 and in case another queuing job having a higher priority (a job having higher priority next to the interrupted job having completed execution) than that of the currently aborted job in the job cue exists (step S150; Yes), returning to step S144 and the queuing job proceeds to steps after step S144 in the same manner. In case the job having a higher priority than that of the aborted job in the job cue does not exist (step S150; No.), the job aborted restarts execution (step S151), and the job restarted proceeds the steps after S151.

In case of the queuing job executed as the interrupt job is completed or in case the job aborted by interruption and restarted is completed (step S152; Yes), the job administration section 31 also renews the execution counter corresponding to the corresponding module of the job (all the corresponding modules (control module) used for execution of the said job) by incrementing the counter by one (step S153). Then the job is deleted from the job cue (step S154) and the present sub-routine is terminated for returning to the main routine (return to step S108 in FIG. 6).

The following exemplary interruptions occur by interruption the control in a job execution operation shown in FIG. 10.

For example, in case a first job 1, a second job 2 and a third job 3 in an input order (registration order to the job cue) are to executed, interruptions occur as the following:

Job 1 not executable→job 2 not executable→job 3 executable→job 3 starts execution→job 2 executable→job 3 aborts→job 2 starts execution (interruption with respect to job 3)→job 1 executable→job 2 aborts→job 1 starts execution (interruption with respect to job 3)→job 1 completed→job 2 restarts→job 2 completed→job 3 restarts→job 3 completed.

In the multi function peripheral 10, according to the above operation, the following examples of availability of execution occur with respect to various kinds of jobs (job types) described in FIG. 3 and FIG. 5.

For example, in the copying printing job shown in FIG. 3, the scanner control section 35 to control the scanner section 20 and the print control section 36 to control the printer section 22 are used. In case at least one of the two control modules is judged that the virus check is necessary, execution of the copying printing job is held.

For example, in case only the scan control section 35 is judged that the virus check is necessary, the virus check with respect to the scan control section 35 is conducted. The print control section 36 currently judged that the virus check is not necessary is not subject to the virus check and becomes usable. At this stage, if the other control modules such as the facsimile communication control section 37, the network communication control section 38, the connection control section 39 and file system section 40 are judged that the virus check is not necessary, other jobs related to printing become executable. In case executable jobs related to printing are registered in the printing cue 51, the jobs are allowed to be executed and start in first. Also, the jobs not related to printing which do not use the scan control section 35 are executable. For example, the jobs related to transmission except scan transmission jobs shown in FIG. 4 and the jobs related to storing except scan input storing jobs shown in FIG. 5 are executable. In case the aforesaid executable jobs related to transmission and storing are registered in the storing cue 53, the execution is allowed and started in first.

In case the print control section 36 is judged that the virus check is necessary, execution of the job related to printing are held. However, even in this state, if the other control module is judged that the virus check is necessary, the jobs related to transmission and storing (jobs not related to printing) are executable and if theses jobs are registered in the transmission cue 52 or the storing cue 53, execution is allowed and starts in first.

As above, in the multifunction peripheral 10 related to the present embodiment, for the plurality of the control modules which are differently combined to be used in accordance with the job, the virus check is conducted with respect to some of control modules (the modules used for one job) respectively so that the jobs using only the control modules which are confirmed to be not infected by the virus are allowed to be executed. Whereby, it obviates that the control modules, which are uncertain about infection by the viruses, are operated by executing the job using the control modules. Also while obviating a possibility of causing spreading infection of the computer viruses and incorrect operation by the computer viruses in case the controls modules are infected by the viruses, the job using the modules not having possibility of being infected can be executed. Therefore, adverse affects to job processing cased by the virus check are suppressed and reduction of the productivity is suppressed.

In the present invention, the virus check is conducted before executing the job with respect to the control modules used for the job. Whereby, after confirming the control modules being not infected by the virus or after removing the virus in case the modules are infected, the job is executed and the control modules used for the job can be operated. Thus the damage caused by the computer virus is unfailingly obviated even if the control modules are infected by the virus.

Also, since the virus check is conducted for only the modules necessary for the job to be executed from now on and the virus check of less necessity for the unnecessary control modules at present time is not conducted, a burden due to the virus check can be reduced. Also, sine a delay of starting execution of the job can be minimized by completing the virus check before executing the job, reduction of the productivity can be suppressed.

Also, the virus check for the control module is conducted for each predetermined number of times of use (every time the count value of the execution counter reaches to the predetermined value A) and the virus check is not conducted in a period where the number of times of use is less than the predetermined number of times. Whereby, for example, compared to a case where the virus check is conducted for the control modules used for the job every time before the job is executed, the number of the jobs to be delayed for starting execution (number of the queuing jobs) can be reduced, thus the reduction of the productivity can be suppressed.

In the present embodiment, in case, for example the plurality of queuing jobs occur by the interrupt control (multi interrupts) described in job execution in FIG. 10, the job can be executed from the jobs having higher priority in order of priority as much as possible.

Second Embodiment

In the first embodiment, the case that the interrupt process in the course of job execution is conducted has been described. In the second embodiment, a case that the interrupt process in the course of job execution is not conducted will be described.

Figure 11:
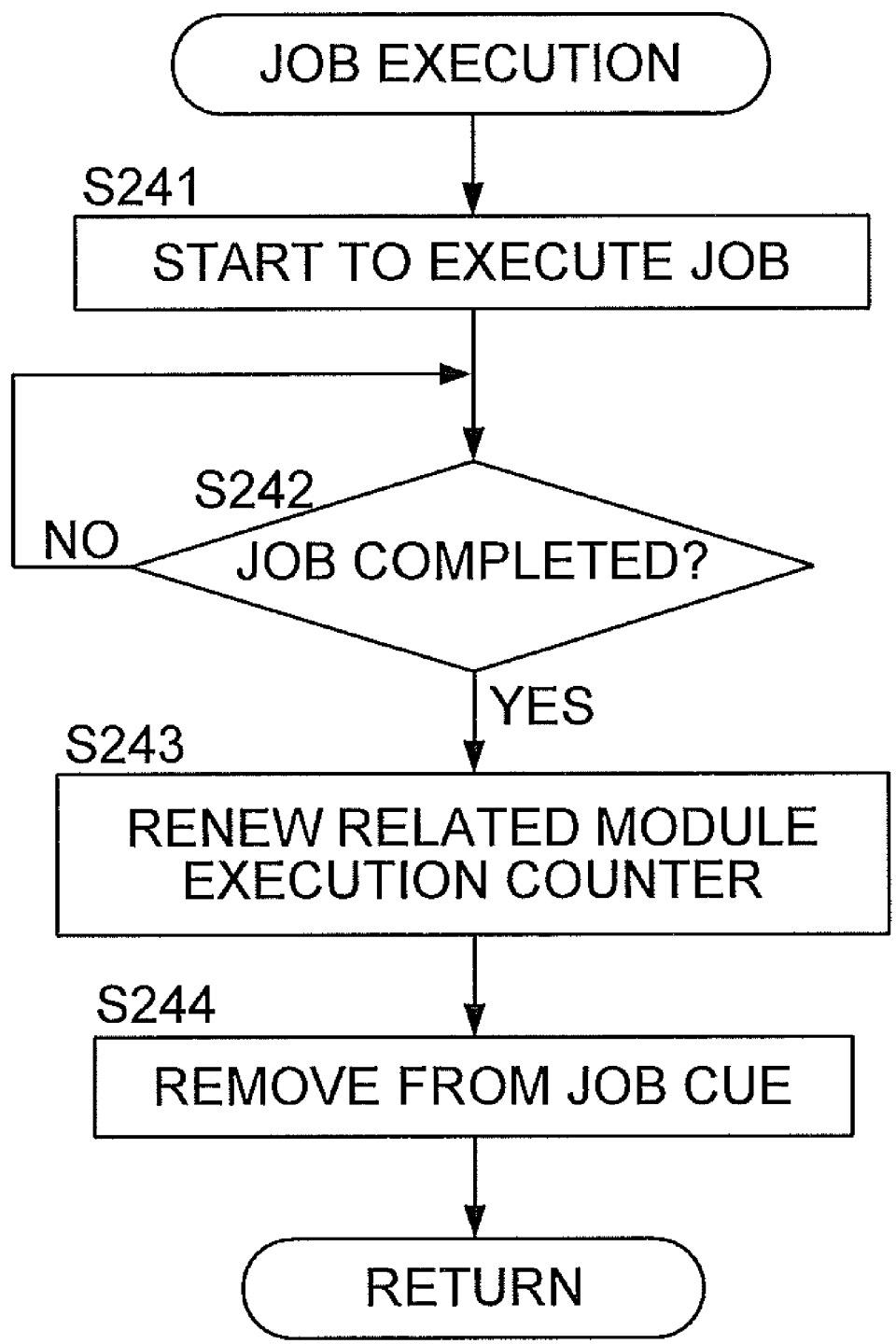
FIG. 11 is a flow chart showing a sub-routine to execute a job by a job administration section related to a second embodiment of the present invention.

FIG. 11 is a flow chart showing a sub-routine of job execution by the job administration section 31 related to the present embodiment. In the present sub-routine, steps S142 to S151 are eliminated from the flow with respect the sub-routine of FIG. 10 related to the first embodiment.

If the job administration section 31 judges that the job is executable in step S103 in FIG. 6 and the present sub-routine related to execution of the job which allowed to be executed (step S107) starts, the execution of the job starts (step S241) and completion is watched (step S242; No.).

When execution of the job is completed (step S242; Yes), the job administration section 31 renews the execution counters corresponding to all the corresponding modules (control modules) used for the job by incrementing by one (step S243), then eliminates the job form the job cue (step S244), and terminates the present sub-routine so as to return to the main routine (Return→step S108 in FIG. 6).

In the sub-routine related to the first embodiment (FIG. 10), the virus check completion notification from the virus control section 32 is watched by the job administration section 32 during execution of the job (step S142), however in the sub-routine related to the present embodiment, watching of the virus check completion notification is omitted. In the present embodiment, irrespective of reception of the virus check completion notification from the virus control section 32, the job administration section 31 instructs the virus control section 32 to confirm the virus check and removing in step S102 of FIG. 6 as far as the queuing job exists in the job cue, and judges availability of execution of the queuing job based on the result thereof. Therefore, in the present embodiment, the virus check completion notifications (steps S124 in FIG. 8 and step S137 in FIG. 9) with respect to the job administration section 31 by the virus control section 32 can be omitted.

Whereby, in the present embodiment, the job once started execution is continued to be executed and completed without the interruption caused by execution of other jobs. Even if it is a case that the virus check and removing for corresponding modules corresponding to a queuing job having a high priority is completed and the queuing job becomes executable, the job once started execution is continued to be executed without the interruption. The job became executable is to be executed after execution of the job started in advance is completed. Whereby, the control to administrate the job execution order is simplified.

Third Embodiment

In the first embodiment, a case that the virus check start instruction with respect to the corresponding module is made before executing the job has been described. In the third embodiment, a case that the instruction is made after execution of the job will be described.

Figure 12:
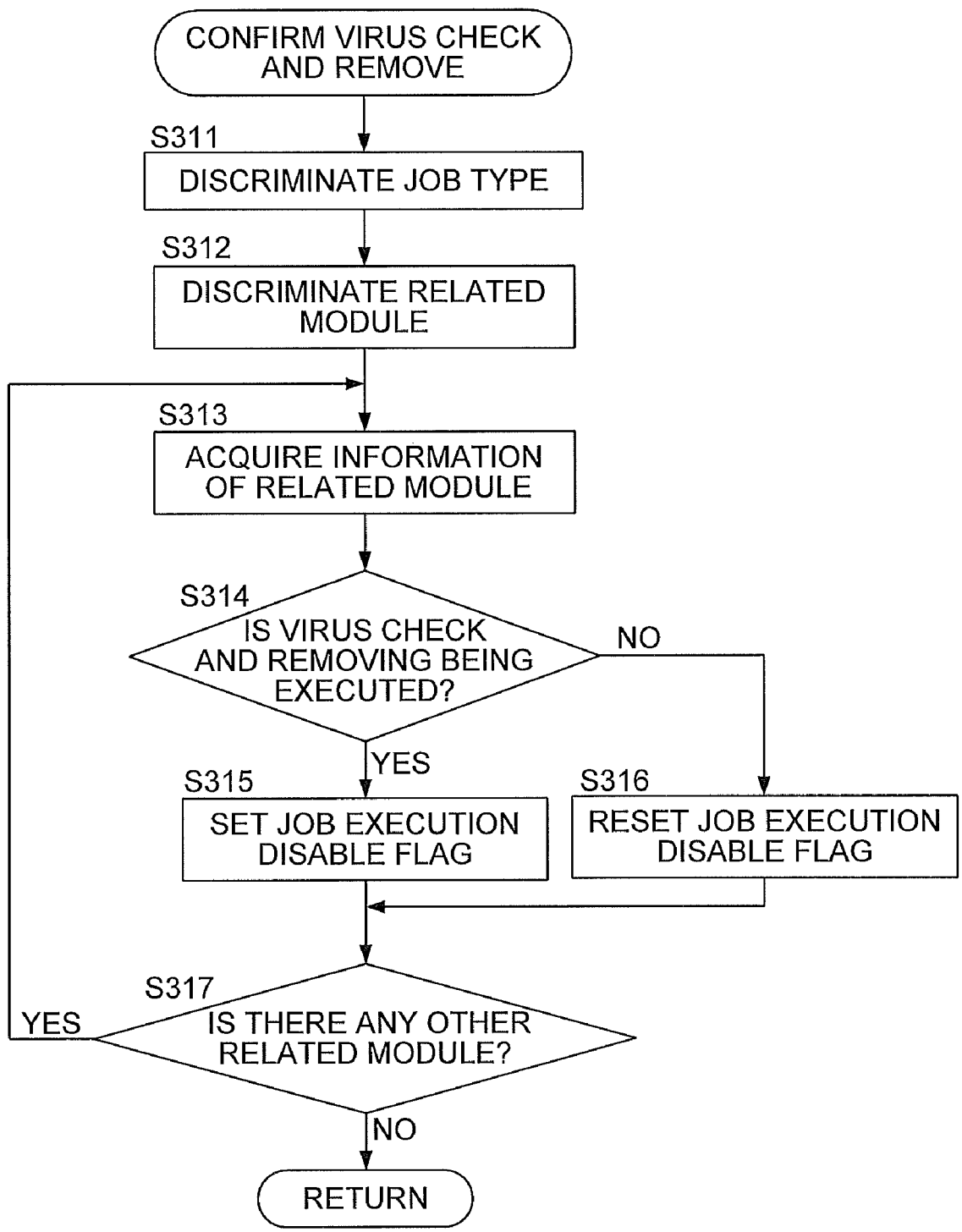
FIG. 12 is a flow chart showing operation of virus check and removing by a virus control section related to a third embodiment of the present invention.

FIG. 12 is a flow chart showing operation of the virus check and removing by the virus control section 32 related to the present embodiment. An operation flow of the present operation is a flow where confirmation of the count value of the execution counter corresponding to the corresponding modules (step S115) and the virus check start instruction (step S116) are omitted with respect to the operation (FIG. 7) related to the first embodiment.

The portions altered will be described as follow. In case the corresponding module is executing the virus check or virus removing (step S314; Yes), the virus control section 32 sets the job execution disable flag corresponding to the job acquired from the job cue in step S101 of FIG. 6 in which the above corresponding module is used (step S315) and the flow proceeds to step S317 (equivalent to step S119 in FIG. 7). In case the corresponding module is not in the course of the virus check or virus removing (step S314; No), the job disable flag related to the above job which uses the corresponding module is reset (step S316) and the flow proceeds to step S317.

Incidentally, in case a plurality of the corresponding modules exist, resetting of the job execution disable flag in step S316 is performed only while the virus check and removing are not being executed for all corresponding modules (step S314; No), and the job execution disable flag is set if any one of corresponding modules are in the course of the virus check or removing (step S114; Yes) in the present embodiment as well.

Figure 13:
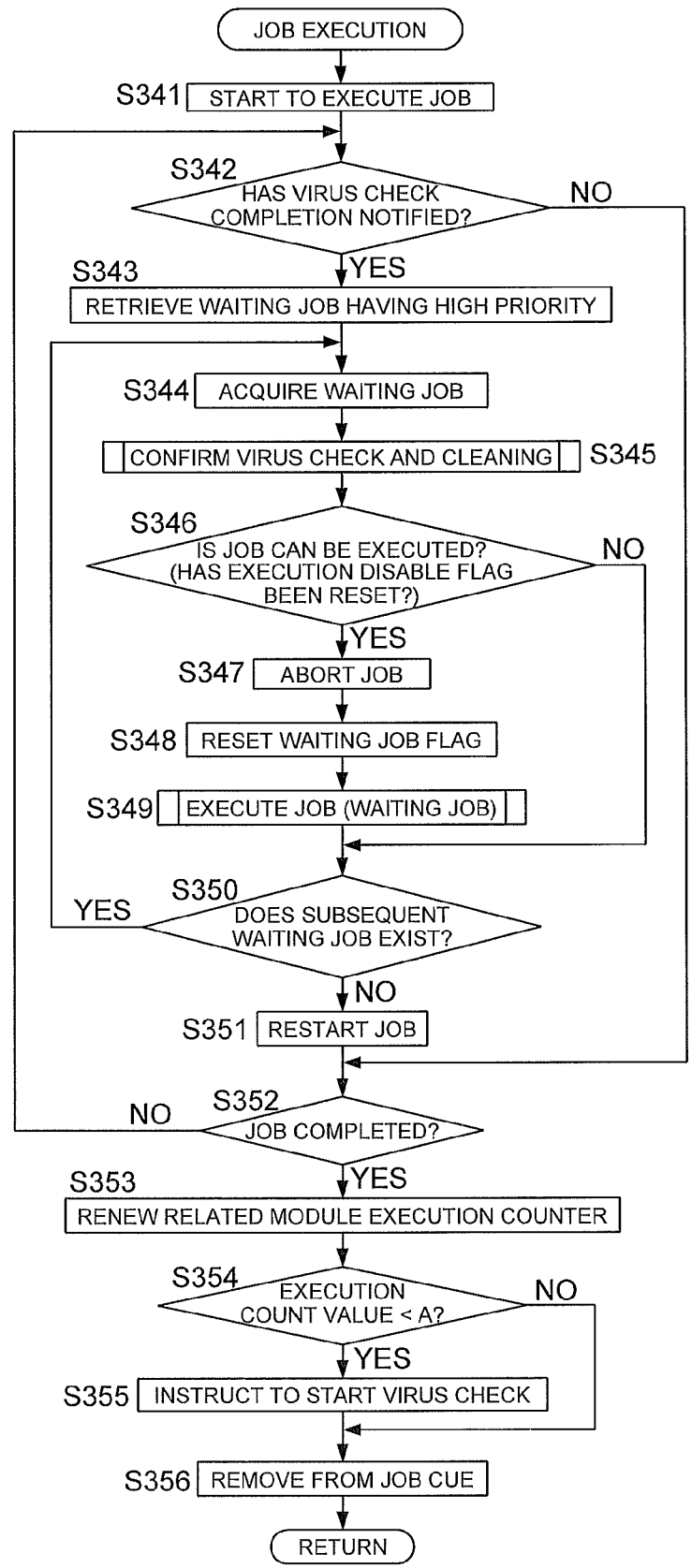
FIG. 13 is a flow chart showing a sub-routine to execute a job by a job administration section related to a third embodiment of the present invention.

FIG. 13 shows a flow of a sub-routine of job execution by the job administration section 31 related to the present embodiment. The present sub-routine has a flow where confirmation (step S354) of the count value of the execution counter after the execution counter with respect to the corresponding module is renewed (step S353) and an instruction of virus check start (step S355) are added to the sub-routine (FIG. 10) related to the first embodiment.

The portions altered will be described as follow. When the job is completed (step 352), the job administration section 31 renews the execution counter corresponding to the plurality of the corresponding modules (control modules) used for the job by incrementing by one (step S353). In case the count value of the execution counter after renewal is less than the predetermined value A (step 3354; No), the job administration section 31 eliminates the job from the job cue (step S356), and terminates the present sub routine, then the flow returns to the main routine (Return→step S108 of FIG. 6).

In case the count value of the execution counter after renewal is equal or more than the predetermined value A, (step S354; Yes), the job administration section 31 instructs the virus check section 33 to start the virus check with respect to the corresponding module or the plurality of corresponding modules via the virus control section 32 (step S355). The virus check section 33 starts the virus check with respect to the corresponding module on receipt of the instruction. Then the job administration section 31 eliminates the job form the job cue (step S356) and terminates the present sub-routine then the flow returns to the main routine (Return→step S108 of FIG. 6).

As above, the virus check is performed with respect to the control module (corresponding module) whose number of times of use has reached to the predetermined number of times after execution of the job because the module is used for job execution. Whereby, the control module can be operated for a subsequent use after confirming no virus infection or after removing the virus in case of being infected, and damages cased by the computer virus is obviated for the subsequent use.

Also, the virus check is performed only for the control module having been used and the virus check currently having less necessity for the control module not having been used are not performed, thus the burden due to the virus check can be reduced. Also, since the virus check starts after using the control module (after executing the job), compared to the case that the virus check starts before use (before job execution), the job which uses the control module subsequently can be started rapidly, and reduction of the productivity is suppressed.

Also, the virus check with respect to the control module used for executing job is performed for every predetermined number of times of use (every time the count value of the execution counter becomes the predetermined value A) in the same manner as the first embodiment, and the virus check is not performed in a period where the number of times of use is less than the predetermined number of times. Whereby, for example, compared to the case where the virus check is performed with respect to the control module having been used for the job, every time after the job is executed, the number of the jobs which are delayed to start of execution (queuing jobs) can be reduced and reduction of the productivity is suppressed.

As above, the embodiment of the present invention has been described with reference to the drawings, however practical configurations are not limited to the configurations shown by the embodiments, and it is understood that changes and variations may be made without departing form the scope or spirit of the appended claim.

For example, as the multifunction periphery described in the embodiment, in case that the plurality of control modules, which are provided corresponding to a plurality of functions (scan function, printer function, and facsimile function), include a control module to control a data input source and a control module to control a data output destination, both of the modules can be the objects of the virus check or either of the modules can be the object of the virus check. Specifically, in either case, i.e. before or after job execution, since the each control module to control the data input source and the data output destination can be identified by the job type, either of the control modules can be the object of the virus check.

The predetermined period where the virus check is omitted can be set differently between the control modules of data input source side and data output destination side, or can be set respectively for the control modules.

The period where the virus check is omitted is the hours of use of the control module (operation hours), besides the number of times of use (number of operation time) of the control module. In case of hours of use, for example, an execution timer is provided for measuring a cumulative house of use for each control module instead of the execution counter to count the number of times of use described in the embodiment, so that the execution timer measure corresponding to each control module measures the cumulative hours of use of the control module thereof. If a value of the timer is less than a predetermined hours, execution of the virus check is not instructed, and if the value of the timer is more than the predetermined hours, execution of the virus check is instructed. In the above case, the administration section (virus control section) can measure the hours of use (cumulative hours of use) using the execution timer.

The timing of the virus check and removing is not limited to the timings (before or after execution) synchronized with execution of the job described in the embodiment, and it can be a timing not synchronized with job execution. For example, the virus check can be performed in vacant hours where processing related to job is not carried out. In case of not synchronized with job execution, administration of state of the virus check and removing is further carried out for each control module, and currently executable jobs are judged base on the states of each module, then whether or not the job is executable (start execution, hold or queuing) can be judged when the job is inputted based on a result of the aforesaid judgment. For example, in case that it is judged that only the print control section shown in FIG. 2 is currently in the course of the virus check and removing, if the job inputted is a job related to print, the job is judged to be not executable and held or cues, then if it is a job related to storing, it is judged to be executable and operations such as starting execution is possible.

Also, in the embodiment, while the job administration section and the virus control section are configured separately due to the functions, they can be configured as one administration section. For example, the job administration section described in the embodiment can be provided with functions of the virus control section.

Also, in the embodiment, the multi function periphery (image processing apparatus) is configured to provide the virus check section and the virus removing section, however, an external device (server) included in the job processing system can be provided with the virus check section and the virus removing section. For example, in case that the virus check and removing of the control module is judged to be necessary, the administration section (inspection administration section such as the virus control section and the job administration section which is provided with the function of the virus control section) of the multi function periphery instructs the server (inspection section), which is provided with the virus check and removing section, the virus check and removing of the control module. The server having received the instruction can execute the virus check and removing with respect to the control module in the multi function periphery.

Also, the job processing system and the image processing apparatus related to the present invention are not limited to the multi function periphery described in the embodiment. It can include systems and apparatuses provided with a plurality of control modules capable of a plurality of functions (a plurality of kinds of jobs).

According to the job processing system and the image processing apparatus of the present invention, an effect to job processing due to the computer virus inspection is reduced and reduction of the productivity is suppressed.

What is claimed is:

1. A job processing system for a multi-function peripheral (MFP) that is configured to perform a plurality of image processing functions, comprising a hardware processor and a plurality of control modules, wherein each of the plurality of control modules is configured to perform a function for the MFP;
   the hardware processor performing the following steps:
   acquiring a job;
   using a combination of one or more of the control modules to execute the job, wherein the job is one of a printing job, a scanning job, a facsimile job, and a copying job;
   wherein executing the job comprises:
   selecting one or more of the plurality of control modules necessary to perform the job;
   inspecting whether or not the selected one or more of the plurality of control modules is infected by a computer virus; and
   permitting execution of the job which uses only the control modules which have been confirmed being not infected by the computer virus via the virus inspection among the plurality of the control modules.

2. The job processing system of claim 1, wherein the virus inspection inspects the control modules to be used for execution of the job before executing the job.

3. The job processing system of claim 1, wherein the virus inspection inspects the control modules which have been used for execution of the job after executing the job.

4. The job processing system of claim 1, wherein the virus inspection omits the virus inspection with respect to the control modules which have been confirmed being not infected for a predetermined period after the confirmation, and recognizes that the control module is confirmed at least for the predetermined period.

5. An image processing apparatus included in the job processing system of claim 1 to execute the job as a job related to image data, wherein the plurality of control modules is in the image processing apparatus, and wherein the inspection uses an inspection section outside of the image processing apparatus perform the virus inspection.

6. The job processing system of claim 1, wherein execution of a first job, which uses the control modules which have not been confirmed being not infected by the computer virus via the virus inspection among the plurality of the control modules, is held, and execution of a second job, which uses only the control modules which have been confirmed being not infected, is started.

7. A job processing system for a multi-function peripheral (MFP) that is configured to perform a plurality of image processing functions, comprising a hardware processor and a plurality of control modules, wherein each of the plurality of control modules is configured to perform a function for the MFP;
   the hardware processor performing the following steps:
   acquiring a job;
   using a combination of one or more of the control modules to execute the job, wherein the job is one of a printing job, a scanning job, a facsimile job, and a copying job;
   wherein executing the job comprises:
   selecting one or more of the plurality of control modules necessary to perform the job;
   inspecting whether or not the selected one or more of the plurality of control modules is infected by a computer virus; and
   permitting execution of the job which does not use the control modules which have not been confirmed being not infected by the computer virus via the virus inspection among the plurality of the control modules.

8. The job processing system of claim 7, wherein execution of a first job, which uses the control modules which have not been confirmed being not infected by the computer virus via the virus inspection among the plurality of the control modules, is held, and execution of a second job, which uses only the control modules which have been confirmed being not infected, is started.

9. The job processing system of claim 8, wherein the first job is executed by interrupting execution of the second job when all the control modules used for execution of the first job are confirmed being not infected by the computer virus, in case the first job has a higher priority than that of the second job.

10. The job processing system of claim 8, wherein execution of the second job is completed without being interrupted by execution of another job.

11. The job processing system of claim 7, wherein execution of a first job, which uses the control modules which have not been confirmed being not infected by the computer virus via the virus inspection among the plurality of the control modules, is held, and execution of a second job which does not use the control modules which have not been confirmed being not infected is started.

12. The job processing system of claim 7, wherein the inspection omits the virus inspection with respect to the control modules which have been confirmed being not infected for a predetermined period after the confirmation, and recognizes that the control modules are confirmed at least for the predetermined period.

13. The job processing system of claim 7, wherein execution of a first job, which uses the control modules which have been confirmed being not infected by the computer virus via the inspection among the plurality of the control modules, is held, and execution of a second job which uses only the control modules which have been confirmed being not infected, is started.

14. An image processing apparatus included in the job processing system of claim 7 to execute the job as a job related to image data, wherein the plurality of control modules is in the image processing apparatus, and wherein the inspection uses an inspection section outside of the image processing apparatus to perform the virus inspection.

15. The job processing system of claim 7, wherein the inspection control section makes the virus inspection section to omit the virus inspection with respect to the control modules which have been confirmed being not infected for a predetermined period after the confirmation, and recognizes that the control module is confirm at least for the predetermined period.

16. A job processing system for a multi-function peripheral (MFP) that is configured to perform a plurality of image processing functions, comprising:
    a hardware processor and a plurality of control modules, wherein each of the plurality of control modules is configured to perform a function for the MFP;
    the hardware processor performing the following steps:
    acquiring a job;
    using a combination of one or more of the control modules to execute the job wherein the job is one of a printing job, a scanning job, a facsimile job, and a copying job;
    wherein executing the job comprises:
        judging which control modules are used in execution of the acquired job and
        performing a virus inspection with respect to the control modules having been judged as to be used for the acquired job and
        inspecting whether or not a selected one or more of the plurality of control modules is infected by a computer virus;
    wherein the job is executed if the selected control modules were determined not being infected by the computer virus.

17. The job processing system of claim 16, wherein the inspection omits the virus inspection with respect to the control modules which have been confirmed being not infected for a predetermined period after the confirmation, and recognizes that the control modules are confirmed at least for the predetermined period.

18. The job processing system of claim 16, wherein execution of a first job, which uses the control modules which have not been confirmed being not infected by the computer virus via the virus inspection among the plurality of the control modules, is held, and execution of a second job, which uses only the control modules which have been confirmed being not infected, is started.

19. An image processing apparatus included in the job processing system of claim 16 to execute the job as a job related to image data, wherein the plurality of control modules is in the image processing apparatus, and wherein the inspection uses an inspection section outside of the image processing apparatus to perform the virus inspection.

20. The job processing system of claim 16, wherein execution of a first job, which uses the control modules which have not been confirmed being not infected by the computer virus via the virus inspection among the plurality of the control modules, is held, and execution of a second job which does not use the control modules which have not been confirmed being not infected is started.

21. An image forming apparatus that is configured to perform a plurality of image processing functions, comprising a hardware processor and a plurality of control modules, wherein each of the plurality of control modules is configured to perform a function for the image forming apparatus;
    the hardware processor performing the following steps:
    acquiring a job;
    using a combination of one or more of the control modules is used to execute the job, wherein the job is one of a printing job, a scanning job, a facsimile job, and a copying job;
    wherein executing the job comprises:
        selecting one or more of the plurality of control modules necessary to perform the job;
        inspecting whether or not the selected one or more of the plurality of control modules is infected by a computer virus; and
        permitting execution of the job which uses only the control modules which have been confirmed being not infected by the computer virus via the virus inspection among the plurality of the control modules.

22. An image forming apparatus of claim 21, wherein execution of a first job, which uses the control modules which have not been confirmed being not infected by the computer virus via the virus inspection among the plurality of the control modules, is held, and execution of a second job, which uses only the control modules which have been confirmed being not infected, is started.

23. An image forming apparatus that is configured to perform a plurality of image processing functions, comprising a hardware processor and a plurality of control modules, wherein each of the plurality of control modules is configured to perform a function for the image forming apparatus;

the hardware processor performing the following steps:
acquiring a job;
using a combination of one or more of the control modules is used to execute the job, wherein the job is one of a printing job, a scanning job, a facsimile job, and a copying job;
wherein executing the job comprises:
selecting one or more of the plurality of control modules necessary to perform the job;
inspecting whether or not the selected one or more of the plurality of control modules is infected by a computer virus; and
permitting execution of the job which does not uses the control modules which have not been confirmed being not infected by the computer virus via the virus inspection among the plurality of the control modules.

24. An image forming apparatus of claim 23, wherein execution of a first job, which uses the control modules which have not been confirmed being not infected by the computer virus via the virus inspection among the plurality of the control modules, is held, and execution of a second job which does not use the control modules which have not been confirmed being not infected is started.

25. An image forming apparatus that is configured to perform a plurality of image processing functions, comprising a hardware processor and a plurality of control modules, wherein each of the plurality of control modules is configured to perform a function for the image forming apparatus;
the hardware processor performing the following steps:
acquiring a job;
using a combination of one or more of the control modules to execute the job, wherein the job is one of a printing job, a scanning job, a facsimile job, and a copying job;
wherein executing the job comprises:
judging which control modules are used in execution of the acquired job; and
making the inspection section perform the virus inspection with respect to the control modules having been judged used for the acquired job,
wherein the job is executed if the judged one or more of the plurality of control modules necessary to perform the job has been confirmed being not infected by the computer virus via the virus inspecting among the plurality of the control modules.

26. A non-transitory computer readable recording medium encoded with a program to operate an image forming apparatus that is configured to perform a plurality of image processing functions, the image forming apparatus having a hardware processor and a plurality of control modules, wherein each of the plurality of control modules is configured to perform a function for the image forming apparatus, and wherein a combination of one or more of the control modules is used to execute a job, wherein the job is one of a printing job, a scanning job, a facsimile job, and a copying job;
the program causing the hardware processor to select one or more of the plurality of control modules necessary to perform the job; and perform a virus inspection the selected one or more of the plurality control modules, execution being permitted for the job which uses only the control modules which have been confirmed being not infected by the computer virus via the virus inspection among the plurality of the control modules.

27. The non-transitory computer readable recording medium of claim 26, wherein execution of a first job, which uses the control modules which have not been confirmed being not infected by the computer virus via the virus inspection among the plurality of the control modules, is held, and execution of a second job, which uses only the control modules which have been confirmed being not infected, is started.

28. A non-transitory computer readable recording medium encoded with a program to operate an image forming apparatus that is configured to perform a plurality of image processing functions, the image forming apparatus having a hardware processor and a plurality of control modules, wherein each of the plurality of control modules is configured to perform a function for the image forming apparatus, and wherein a combination of one or more of the control modules is used to execute a job, wherein the job is one of a printing job, a scanning job, a facsimile job, and a copying job;
the program causing the hardware processor to select one or more of the plurality of control modules necessary to perform the job; and perform a virus inspection for the selected one or more of the plurality control modules, execution being permitted for the job which does not use the control modules which have not been confirmed being not infected by the computer virus via the virus inspection among the plurality of the control modules.

29. The non-transitory computer readable recording medium of claim 28, wherein execution of a first job, which uses the control modules which have not been confirmed to be not infected by the computer virus via the virus inspection among the plurality of the control modules, is held, and execution of a second job which does not use the control modules which have not been confirmed being not infected is started.

30. A non-transitory computer readable recording medium encoded with a program to operate an image forming apparatus that is configured to perform a plurality of image processing functions, the image forming apparatus having a hardware processor and a plurality of control modules, wherein each of the plurality of control modules is configured to perform a function for the image forming apparatus, and wherein a combination of one or more of the control modules is used to execute a job, wherein the job is one of a printing job, a scanning job, a facsimile job, and a copying job;
the program causing the hardware processor to acquire the job, to judge which control modules are used in execution of the acquired job, to conduct a virus inspection with respect to the control modules to be used for execution of the acquired job, and execute the job if the inspected control modules are confirmed to be not infected by viruses.

31. A control method of an image forming apparatus, the image forming apparatus having a hardware processor and a plurality of control modules, wherein each of the plurality of control modules is configured to perform a function for the image forming apparatus, and wherein a combination of one or more of the control modules is used to execute a job, wherein the job is one of a printing job, a scanning job, a facsimile job, and a copying job; the method comprising:
selecting one or more of the plurality of control modules necessary to perform the job; and
using the hardware processor to perform a virus inspection for the selected one or more of the plurality control modules, and permitting execution for the job which uses only the control modules which have been confirmed being not infected by the computer virus via the virus inspection among the plurality of the control modules.

32. The control method of the image forming apparatus of claim 31 to operate an image forming apparatus, wherein execution of a first job, which uses the control modules which have not been confirmed being not infected by the computer virus via the virus inspection among the plurality of the control modules, is held, and execution of a second job, which uses only the control modules which have been confirmed being not infected, is started.

33. A control method of an image forming apparatus, the image forming apparatus having a hardware processor and plurality of control modules, wherein each of the plurality of control modules is configured to perform a function for the image forming apparatus, and wherein a combination of one or more of the control modules is used to execute a job, wherein the job is one of a printing job, a scanning job, a facsimile job, and a copying job; the method comprising:
 selecting one or more of the plurality of control modules necessary to perform the job; and
 using the hardware processor to perform a virus inspection for the selected one or more of the plurality control modules, and permitting execution for the job which does not use the control modules which have not been confirmed being not infected by the computer virus via the virus inspection among the plurality of the control modules.

34. The control method of the image forming apparatus of claim 33 to operate an image forming apparatus, wherein execution of a first job, which uses the virus via the virus inspection among the plurality of the control modules, is held, and execution of a second job which does not use the control modules which have not been confirmed being not infected is started.

35. A control method of an image forming apparatus, the image forming apparatus having a hardware processor and a plurality of control modules, wherein each of the plurality of control modules is configured to perform a function for the image forming apparatus, and wherein a combination of one or more of the control modules is used to execute a job, wherein the job is one of a printing job, a scanning job, a facsimile job, and a copying job; the method comprising:
 acquiring the job to be executed wherein the job is acquired;
 judging which of the plurality of the control modules is to be used in execution of the acquired job;
 conducting a virus inspection of whether or not the control modules to be used for execution of the acquired job are infected by a computer virus, and executing the job if the control modules are not infected by the virus, where the steps are performed by the hardware processor.

* * * * *